United States Patent [19]

Kennedy

[11] 3,885,552

[45] May 27, 1975

[54] CARDIAC FUNCTION MONITORING SYSTEM AND METHOD FOR USE IN ASSOCIATION WITH CARDIAC PACER APPARATUS

[75] Inventor: James R. Kennedy, Gainesville, Fla.

[73] Assignee: Pacemaker Diagnostic Clinic of American, Inc., Gainesville, Fla.

[22] Filed: Nov. 16, 1972

[21] Appl. No.: 307,182

[52] U.S. Cl...... 128/2.05 R; 128/2.06 R; 128/2.1 A; 128/419 PT

[51] Int. Cl............................................... A61b 5/04

[58] Field of Search..... 128/2.05 R, 2.05 T, 2.06 A, 128/2.06 B, 2.06 F, 2.06 R, 2.1 A, 419 P

[56] References Cited

UNITED STATES PATENTS

| | | | |
|---|---|---|---|
| 3,199,508 | 8/1955 | Roth | 128/2.06 R |
| 3,374,461 | 3/1968 | Anderholm et al. | 128/2.06 A |
| 3,517,662 | 6/1970 | Finch et al. | 128/2.06 B |
| 3,599,627 | 8/1971 | Millen | 128/2.05 R |
| 3,616,790 | 11/1971 | Harris | 128/2.06 A |
| 3,717,857 | 2/1973 | Evans | 128/2.1 A |
| 3,742,938 | 7/1973 | Stern | 128/2.05 T |

OTHER PUBLICATIONS

Gregn et al., "Medical and Biological Engineering", Vol. 9, pp. 503–508, 1971.

*Primary Examiner*—William E. Kamm
*Attorney, Agent, or Firm*—Cushman, Darby & Cushman

[57] ABSTRACT

A diagnostic method and system for the detection and transmission of data from a remote location to a central location relative to the condition of artificial cardiac pacer apparatus. Measurements of selected characteristics of cardiac pacer pulse information including the area, height, width and frequency of the cardiac pacer pulses. Analog signals representative of various of the selected characteristics of the cardiac pacer pulses are generated with bandwidth compression means being provided for compressing the bandwidth characteristics of the analog signals as contrasted with the bandwidth of the cardiac pacer pulses. Gating apparatus serially gates the compressed bandwidth signals into a transmission means for transmission over a telephonic system to a central location. At the central location the signals are interpreted so as to predict cardiac pacer failure or other detectable malfunctions.

28 Claims, 23 Drawing Figures

L
GR
R
60Hz FILTER
POSITIVE PULSE SELECTOR
PACER PULSE SELECTION LOGIC
WIDTH DETECTOR
SWITCH DRIVER
SAMPLE
HOLD
SAMPLE-HOLD
ZERO
AREA ANAL.
HEIGHT ANAL.
AREA
HEIGHT
ECG
ID
COMMUTATOR
VCO
TO REMOTE CLINIC
CLOCK
12 BIT SHIFT REGISTER
Id WORD GEN.
END OF WORD
INITIALIZER
F/F
COMMUTATOR CLOCK 27
MONO STABLE
4 BIT COUNTER + DECODER

K
F
O
100
101
104
108
111
SHIFT REGISTER
116
117
M
102
103
105
119
P
Q
$\bar{Q}$
112
109
106
110
CLOCK
107
÷10
÷10
113
114
115
N
120
121
122

K
F
O
100
101
127
126
131
132
133
125
128
130
129
102
103
119
N
134
135

N
L
143
144
145
140
147
148
141
146
142
M
P
119

E
K
P
R
180
181
182
183
184
185
186

E
K
P
R
180'
181
182
183
190
191
192
193

HEIGHT
AREA
ECG
ID
Q
R
C
S
T
200
201
202
203
204
205
206
207
C1
C2
C3
C4

210
TRANSTELEPHONIC PACEMAKER DIAGNOSTIC ANALYZER
PATIENT
WIRE OR RADIO LINK
217
TONE DEMODULATOR
BACK UP TAPE RECORDER
305
218
OUTPUT
212
DIGITAL INTERNAL TIMER
BCD DIGITAL
INTERNAL VISUAL DISPLAY
216
211
PEN RECORDER
ECG
214
TRIGGER DIGITAL VOLT METER
BCD DIGITAL
215
INTRAGEL VISUAL DISPLAY
213
BINARY TO BCD
BCD

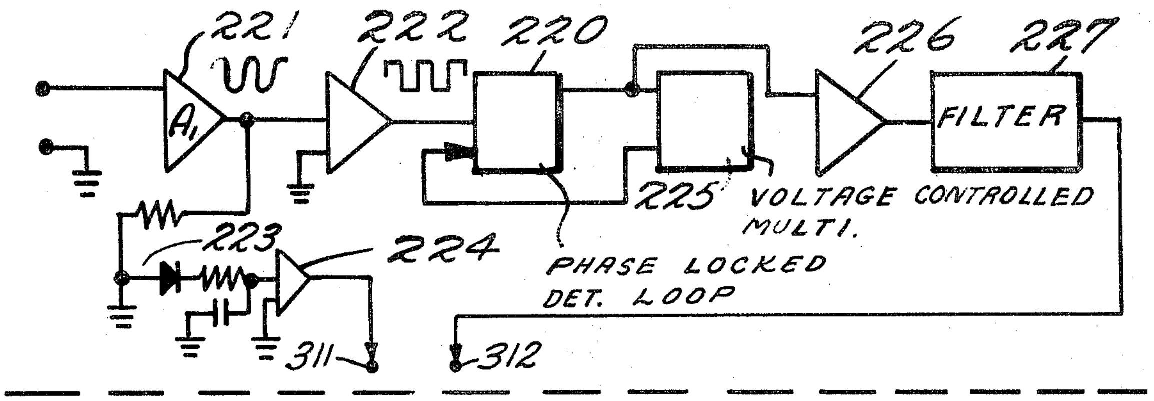
Fig. 11A.
Fig. 11c.
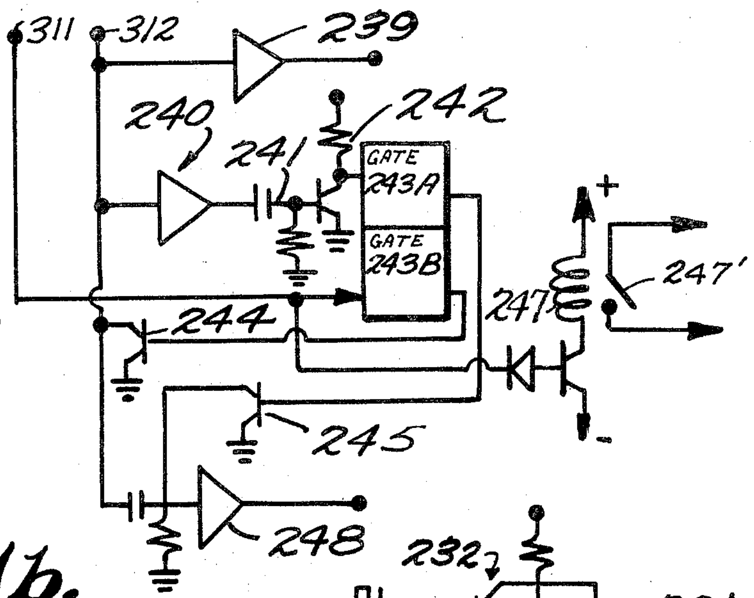
Fig. 11b.
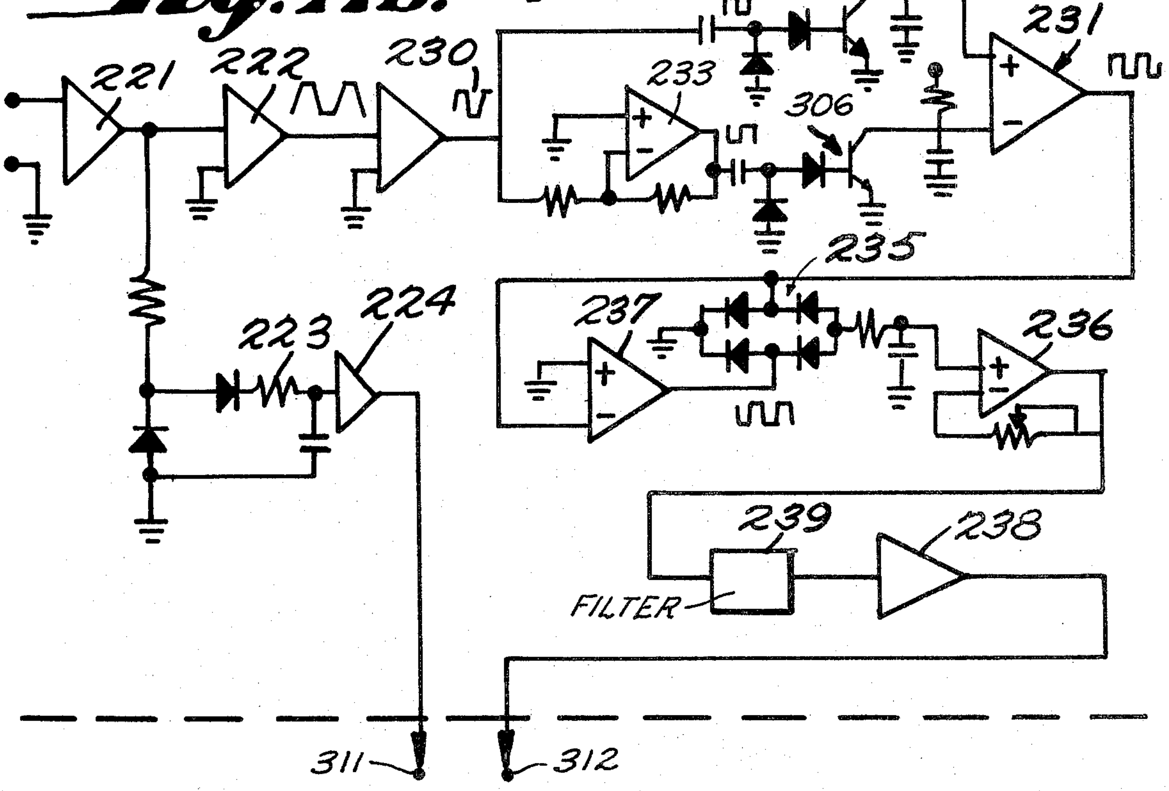

VOLTAGE-CONTROLLED MULTIVBRATOR
P.L. LOOP FREQUENCY DETECTOR
250
251
252
253
254
255
256
257
258
259
260
261
262
263
264
265
+12
-12
+5
-5
GND.

CARDIAC FUNCTION MONITORING SYSTEM AND METHOD FOR USE IN ASSOCIATION WITH CARDIAC PACER APPARATUS

BACKGROUND OF THE INVENTION

The fundamental idea of monitoring cardiac pacer systems stems from the fact that people who have implanted heart cardiac pacers live in jeopardy because batteries in these implanted heart cardiac pacers fail in a random way. People who have cardiac pacers are those, who for one reason or another, have a physical defect wherein the electrical conduction system of their own heart has broken down. This is usually associated with the process of aging, a great percentage of the people being over the age of 65. Occasionally, a coronary or some sort of dramatic event can also lead to the failure of the conduction system of the heart but usually it is aging which precipitates the ailment.

The problem is, then, that the normal impulses that stimulate the heart, and cause it to beat at a normal rate, slow down during rest period and speed up under exertion, do not arrive at the correct points in the heart muscle for causing the ventricles (the lower portion of the heart or the main pump of the heart) to contract. As a result, instead of beating at a normal rate, the heart may beat at a very slow rate, anywhere from about 10 to perhaps 40 beats per minute (bpm), wheras 70 bpm would be normal for a resting, non-exerting adult.

In many patients the disease affects normal cardiac pacing function such that it becomes intermittent. During that period of time that the heart is beating at the slow rate it is very likely that such a patient will faint, fall down and injure himself. Since, as previously mentioned, the patients are old, such a condition could lead to further medical problems. Other obvious problems arise. For example, a failure may occur when a person is driving, or operating other types of equipment.

People who suffer from a failure of their own electrical conduction system of the heart (i.e., cardiac pacer) can be implanted with a battery powered electronic device which provides a stimulus to the heart through a connection with an electrical wire, to the heart muscle. This stimulus keeps the heart pumping at a normal rate. While such devices do not vary the rate of pulses with exertion and rest, it does keep the heart going at about 70 beats per minute. In the case of a patient with an intermittent cardiac pacer the physician will elect to implant what is called a "Demand cardiac pacer" which actually listens to the heart on the same wires that is sends pulses on. If the heart beats faster than a certain rate the artificial cardiac pacer does not fire. In other words, the artificial cardiac pacer allows the heart's own pacemaker to control, but as soon as the heart's cardiac pacer fails to put out a beat within a certain length of time (i.e. when a rate lower than perhaps 70 beats per minute is detected), then the artificial cardiac pacer immediately starts sending impulses and assumes control of the cardiac pacing function.

After initial installation of an artificial cardiac pacer by known surgical techniques the patient is required to have periodic checkups so that the cardiac pacer function may be monitored for possible battery or other failure.

A major problem with these devices is that battery failure is not precisely predictable statistically and while statistics do exist they are unfortunately gathered after pacer failure has occurred. Further, present cardiac pacers available have a functional life expectancy of about two years, but individual ones may not exceed this, and in fact may rather unpredictably fail before this statistical determined period. Usually approximately 90 percent of cardiac pacer failures are battery failures, and the remaining 10 percent are a result of other types of failures, the next most common failure being in the leads themselves. Electronic component failure in artificial cardiac pacers is generally a very small factor. However, all of these factors must be considered when diagnosing a possible malfunction.

Many cardiac pacers are the demand type, mentioned previously, when listen to the heart, which means that the number of times the cardiac pacer fires in a given length of time, depends entirely on the patient. If the patient has an intermittent block, for example once every 6 months, for 5 minutes, the cardiac pacer in question will in all probability last longer than one pulsing constantly.

The number and kinds of variables that exist make an accurate a priori prediction of the lifetime of a given cardiac pacer simply out of the question. The problem therefore is that of measuring the cardiac pacer impulse, the interval between impulses and some charactertisics or set of characteristics which will allow determination in advance of a critical situation, i.e. when cardiac pacer is about to fail.

One such characteristic is that as the battery starts to fail, the voltage output of the pulses starts to drop and generally as the voltage drops the width of the pulse changes. Further, in most cardiac pacers the rate of firing changes.

Ordinarily, the artificial cardiac pacer impulse varies from about 5 to 10 times the threshold of the normal cardiac pacer pulse, the minimum required current. For example, usually the heart requires about 1 ma. current between the electrodes once they are planted to stimulate the heart, whereas standard artificial cardiac pacers generally deliver 10 to 11 ma. There is therefore ordinarily a wide zone between what is actually necessary to maintain the heart function and the actual output of the device. This provides a stabilizing factor so that predictions may be more accurate. In addition, once the pacer is implanted, the heart develops resistance pacing pulses and that normal threshold may well increase. However, such increase is usually not more than a factor of 2. In addition, since most pacers generally are powered by 4 or 5 miniature batteries, present monitoring techniques are geared to detect when the first of those 5 batteries has failed, which means that the safety factor is decreased by about 10 to 20 percent. In any event, a failure of not only one cell but generally two can be tolerated before the patient is in any danger. It should be cautioned however that when a cell does fail, it fails very rapidly. The battery voltage remains almost constant throughout the lifetime of the battery. Therefore, changes may be detected in the pacer output pulses by comparing measurements from one checkup to another.

Now that the basic problem has been examined, there remains now to point out the basic parameters of artificial pacers and the approach to monitoring same from a remote location at relatively frequent intervals. Research has been conducted into what should be detected in order to predict power failure. It has been discovered that the pulse height which may be detected with a highspeed electro-cardiograph is an important parameter. The rate of the pacer is also generally dependent upon battery voltage, and in some cardiac pacers the width of the impulse is dependent upon battery production. By making measurements of these various parameters notice should be taken, depending on the type of cardiac pace, of a sudden change in the value of that critical parameter. For instance, a pacer that beats at 70 bpm for 24 months and suddenly over a period of a few weeks changes to perhaps 65 bpm would be a critical sign of imminent failure. This sudden change in rate in most cardiac pacers is one of the prime indicators of the fact that the battery voltage, in the total stack, has changed by the amount of one cell.

Therefore, according to previous discussion, making measurements of certain characteristics of the pacer impulse, specifically impulse amplitude, width, shape and interval, as detected by a special high-speed electrocardiograph, a satisfactory analysis may be made of the cardiac pacer's functional condition. This analysis even includes establishing the status of the wire lead connecting the pacer with the heart muscle. If such measurements are repeated at regular intervals, it is possible to detect subtle changes in the impulse as the batteries begin to run down. When these signs occur, the pacer may be replaced with the assurance that the patient has had the maximum use of his old pacer, and more important, the minimum amount of pain and discomfort.

In research clinics, where these techniques have already been applied with great success, it has been found that a large volume of background information on the various pacer types is vital. Furthermore, the introduction of computerized analysis and record storage is essential. The final result is that proper cardiac pacer follow up analysis is a very specialized science which requires a multi-disciplinary centralized operation, and if it is going to render effective service to the patient.

Unfortunately, it has been shown that, in order to be certain of reliable determination of the onset of battery failure, it is necessary to make pacer tests as frequently as once a week during the last few months of battery life. This is a result of the fact that the battery cell voltage decays very quickly once exhaustion begins to occur. This works a hardship on the patient since it is often difficult and inconvenient for older people to travel so frequently to a clinic or hospital for analysis. Thus the requirement of centralization of expertise has made it difficult for such services to reach the very people who need them so desperately. It was felt therefore that by connecting the patient with a central clinic by telephone it could in effect bring the clinic to the patient instead of vice versa.

The fundamental stumbling block is the fact that it is theoretically impossible to send the pacer impulse per se over a telephone line without distorting its shape severely, since the frequency bandwidth of the impulse exceeds that of the telephone system by a factor of about 100 times. Such distortion would render the analysis meaningless.

Earlier attempts at phone analysis by others encountered this problem. while some equipment was developed to do pacer followups over the telephone, the only measurement possible was the pacer rate and, in one case, the patient pulse rate. However, the measurement of essential impulse wave-form parameters was impossible without actually bringing the patient into the clinic. In fact, authorities believe that the measurement of changes in two or more of these parameters is necessary for a conclusive diagnosis of impending failure.

The solution, in this disclosure, is a unit which will actually make the waveform measurements in the patient's home. Then, the device sends the result of the measurement over the phone, rather than sending the impulse itself. In another embodiment, the pulse itself is transmitted via a novel electrical system. This is accomplished by processing the signal in such a way as to compress the bandwidth of the parameter measurement, or, in the latter embodiment, the pacer impulse itself.

The device makes possible the establishment of the needed central data bank for providing essential pacer followup services on a nationwide basis over conventional telephone lines. Information may be transmitted to a clinic by the patient, no matter where he may be. This data is received at the clinic and analyzed by a digital computer, which maintains a constantly updated file on the patient's cardiac pacer status. In this way, the medical doctor responsible for the patient's care can be advised of the cardiac pacer's condition by the clinic's reports. This permits the physician to provide truly adequate patient care since he can coordinate the cardiac pacer evaluations with his own program of patient examinations.

One helpful part of cardiac pacer evaluation is to obtain an ordinary electro-cardiogram. Along with the other necessary measurements, the waveform analyzer automatically transmits such a record. This permits the clinic to make several important pacer determinations, such as competition, 1:1 response, polarity and sensing.

While diagnosis of the heart via this ECG is not the clinic's ordinary function, all cardigrams may be reviewed by a specially trained coronary care nurse and forwarded to the physician as a part of his report. In this way, serious heart malfunctions may also be detected by the clinic or the patient's doctor as an additional benefit of the program.

It is therefore an object of the present invention to provide a system and method which obviates one or more of the disadvantages and limitations of the described prior arrangements.

It is another object of the present invention to provide a system and method wherein a patient can communicate with a diagnostic center at a remote location, at intervals frequent enough so as to provide adequate warning of an impending pacer failure.

It is another object of the present invention to provide a system and method for cardiac pacer or other detectable patient functional failures without the necessity of direct physical contact with the diagnostic location.

SUMMARY OF THE INVENTION

A diagnostic system for the detection and transmission of data relative to the condition of artificial cardiac pacer apparatus has been provided wherein measurements of selected characteristics of patient functions are taken and transmitted to a central data clinic for interpretation so as to predict cardiac pacer failure or after detectable malfunctions.

For a better understanding of the present invention, together with other and further objects thereof, reference is directed to the following description, taken in connection with the accompanying drawings, while its scope will be pointed out in the appended claims.

DESCRIPTION OF THE DRAWINGS

FIGS. 11-A-B-C are various embodiments of the demodulator 217 of FIG. 10;

DESCRIPTION OF THE PREFERRED EMBODIMENT

Systems Description

Figure 1:
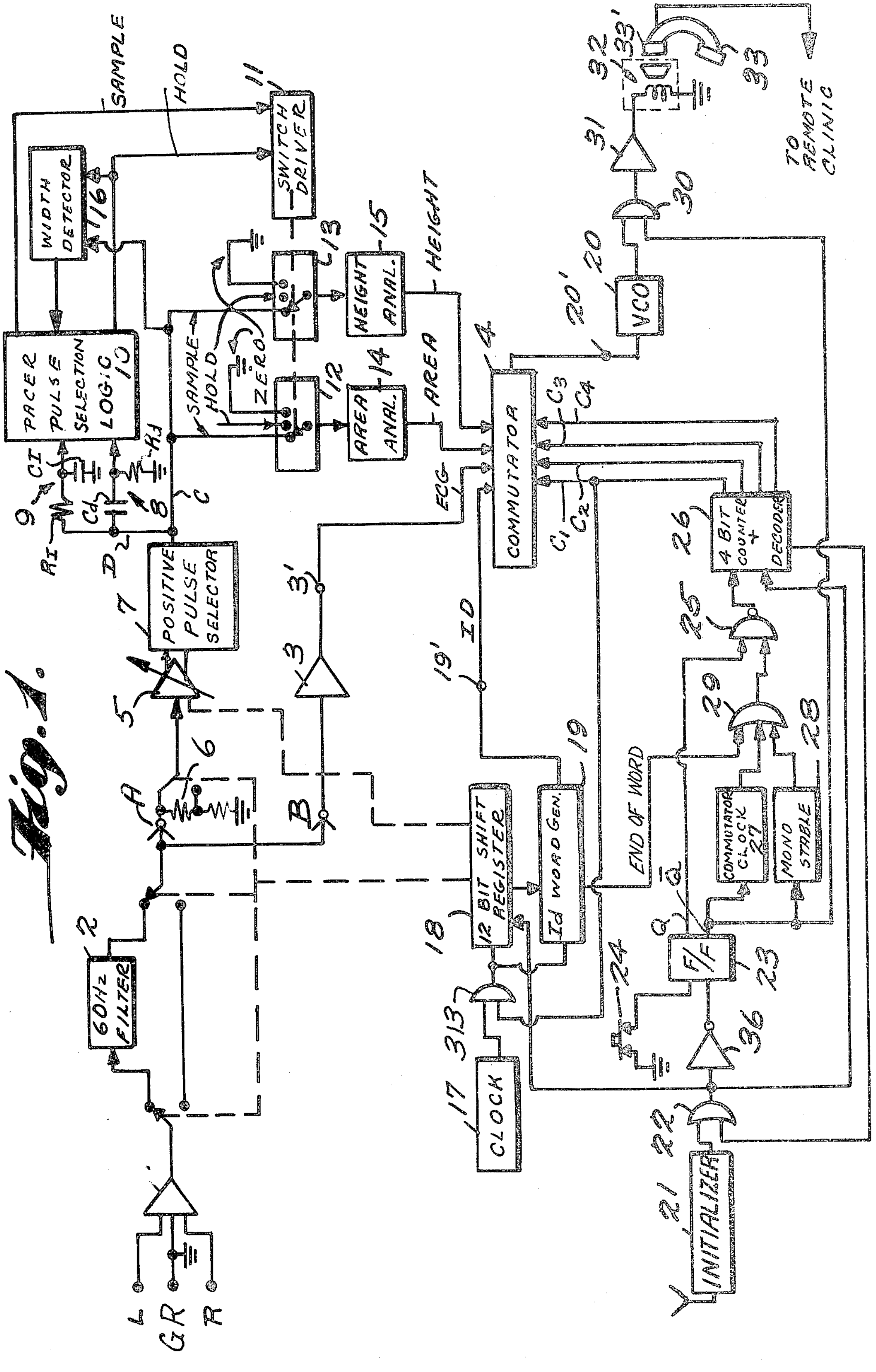
FIG. 1 is a functional block diagram of the system of the present invention.

The transtelephonic cardiac pacer waveform analyzer consists of four basic subsystems: (1) an analog pacer analysis system; (2) an identification code system; (3) a voltage controlled oscillator audio system and (4) a control logic system. These are presented schematically in FIG. 1.

Pacer Analysis System

This system comprises three branches each of which provides its own output. All branches share a common preamplifier 1 and hum notching filter 2. This preamplifier 1 is usually connected to the patient in a lead I configuration, i.e. one pickup for each wrist (signals L and R) and a ground (signal GR) to the other side of one. Other configurations known as lead II and III are also possible but not usually used. A differential voltage is provided with a gain of about 5 with high common mode rejection and a bandwidth well in excess of 100 KHz.

60 Hz hum notch filter 2, of an active type, is an integral component of the pre-amplifier 1. The filter function may be bypassed for pacer output in excess of 45 mv, to avoid excessive ringing.

Following the filter 2, the signal path encounters a two-way branch A–B. The path through amplifier 3 provides a conventional ECG. This amplifier 3 has a gain of about 20 and a bandwidth of 100 Hz. Consequently the ECG channel has an overall gain of 100 and a bandwidth of 100 Hz.

The output of amplifier 3 is delivered to an analog input on a commutator apparatus 4 the function and operation of which will be explained further in the discussion.

Another signal path A through variable gain amplifier 5 constitutes the beginning of two pacer analysis channels. Amplifier 5 constitutes a variable gain amplifier with 4 discrete selectable gain steps and a short risetime on the order of 20 us. Amplifier 5, in combination with a two-step input voltage divider 6, provides sufficient gain for the analysis of pacer impulses from as low as 300 uv to about 1.5V. In order to establish a convention for measurement, it is necessary that the pacer pulse at the output of amplifier 5 be positive going for subsequent analysis. However, there is no guarantee of the input polarity, since pacer impulses may be either positive or negative going. Furthermore, patient error in attaching the electrodes can produce an unwanted inversion. Consequently, amplifier 5 provides both non-inverted and inverted outputs. This guarantees that at least one of the outputs of amplifier 5 will be positive going.

The two outputs are delivered to the positive pulse selector 7 which detects the positive going output and switches it through to the subsequent circuitry.

At this point the signal path encounters another two-way branch C–D. One branch D goes to a keying system including logic circuit 10 and 11 and associated switches 12 and 13, while the other branch C is conducted to area and height analyzers 14 and 15 respsectively through switches 12 and 13. Area and height analyses are accomplished by sample and hold techniques, while the keying system generates the appropriate control signals for the sampling and holding gates.

A primary requisite of these analyses is that they be performed on the pacer impulse and not on some other signal such as the heart response or R wave, as it is known, or noise. Consequently, the keying and analysis circuitry must provide a means of recognizing the pacer impulse and discriminating against other signals, even though in some cases the unwanted signals may be of much higher amplitude.

One of the distinguishing characteristics of the pacer impulse is that it has a very fast risetime. This risetime is typically in the microsecond range at the monitor input and about 20 us at the output of positive pulse selector 7. By contrast, the electrical impulses normally originating in the heart and common noise sources such as 60Hz line noise have rise times on the order of 10 to 20 ms.

Another common source of noise is that generally originating from certain types of electrical appliances being operated from the same power line. These generally have fast rise times but very short duration. Since these individual pulses generally are only fractions of microseconds long, they are distinguished from cardiac pacer impulses principally by the pulse widths since cardiac pacer impulses are commonly in the 1 ms range.

The cardiac pacer impulse, therefore, has two sets of distinguishing characteristics which separate it from the other types of electrical signals that are likely to be picked up from the patient, namely, a very fast rise time, and long pulse width or nominally 1 to 2 ms. Consequently, the output from positive pulse selector 7 is sampled for these two characteristics.

In the first instance, a differentiator 8, including a capacitor C*d* and resistor R*d*, passes only signals with rise times faster than 100 us, while in the second case, an integrator 9, including capacitor $C_I$ and resistor $R_I$, passes only signals with time widths in excess of 250 us. These two sets of signals pass to a pacer pulse selector logic unit 10 which compares these two characteristics in order to distinguish between the pacer impulse itself and whatever other electrical signals may be present. This logic system functions in such a way that any impulse which meets the fast rise time criteria will cause a switch driver 11 to force the switch or selector gates 12 and 13 into a SAMPLE mode for a period in order of 2.5 ms. This permits the electrical impulse to pass into both area integration amplifier 14 and height amplifier 15 during that period. Having thus sampled every fast rise time pulse, the pacer pulse selector logic 10 will, at the end of 2.5 ms sampling period, either switch to a HOLD condition, if in fact a pacer pulse has been observed, or immediately switched ZERO a Zero or cancel condition if the pacer pulse has not been sent. In the HOLD condition, integration amplifier 14 presents an output to the commutator 4 which is proportional to the area underneath the impulse curve which occurred during the 2.5 ms sampling period. Likewise, in the HOLD condition, the height amplifier 15 presents an output to the commutator 4 proportional to the peak impulse amplitude during the 2.5 ms sampling period. If a pacer pulse has not been observed, the switches 12 and 13 are set to ZERO, which cancels the output of both amplifiers 14 and 15.

In the case of the cardiac pacer impulse, the length of time that the area and height output are displayed, that is to say, the length of the HOLD period, depends on the actual width of the cardiac pacer impulse, as measured at some fixed percentage of the maximum impulse amplitude. This is accomplished by way of a pulse width multiplier 16 which engages each time a pulse is sampled. The width multiplier 16 observes the pulse output of the pulse selector 7 and generates, in conjunction with the pacer pulse selector logic 10, an impulse which causes the HOLD period to be 100 times that of the actual cardiac pacer impulse width. Since the actual width is too narrow for telephone transmission, the multiplication by 100 compresses the frequency bandwidth by 100 provides for easier measurement and encoding, as will be described later in the specification.

The net effect of the pacer analysis system is such that only cardiac pacer impulses are measured and pulses are delivered to the commutation 4 having a width 100 times that of the cardiac pacer pulse width. Further, the latter impulse amplitudes are proportional to the integrated pacer impulse area and the peak pacer impulse amplitude respectively and the interval of time between each of the pulses is precisely the same as that interval of time between each successive cardiac pacer impulse.

By this method, the critical impulse parameters of interval, height, area and width are transformed into a series of electrical impulses with compressed bandwidth characteristics that are compatible with transtelephonic transmission.

IDENTIFICATION CODE SYSTEM

The purpose of the Identification Code System is two-fold: Firstly, it transmits a unique binary number which identifies which individual waveform analyzer is sending the data. Thus, it identifies the patient automatically. Secondly, it automatically transmits the scale settings selected for variable gain amplifier 5 and divider 6.

The above is accomplished by transmitting a 12-bit binary word, the first 9 bits of which identify the particular transmitting unit and the last 3 bits of which identify the scale settings.

The ID code system contains a clock 17, which is coupled through a gate 313 to a 12-bit programmable shift register memory 18 and a word generator 19. Appropriate pulses from a control logic system reset the system memory before each use by clearing and resetting the predetermined ID number.

When the commutator 4 is switched to be responsive to the ID, a selector pulse from a 4-bit counter and decoder 26 sends a pulse to open the ID clock gate 313 and allows clock pulses to step a shift register memory 18. The ID number stored in the memory is read into a word generator 19 serially.

The word generator 19 combines the ID number with a "beginning of word" pulse, bit sync pulses and an "end of word" pulse to form the ID code word. This word is then delivered to the appropriate ID analog input on the commutator 4.

The output amplitude level of the ID pulse is standardized and serves as a reference level for a voltage controlled oscillator (VCO) system 20, to be described further in the specification. The generator 19 also signals a control logic gate 29 at the conclusion of the "end of word" pulse which is appropriately labelled in FIG. 1.

THE CONTROL LOGIC SYSTEM

The sequence in which the data is transmitted is established by the control logic. It is desired to transmit in the following sequence: ID; ECG; ID; Area/Width; ID Height/Width; ID - Such a sequence therefore transmits the information with individual check on proper coding. In order to do this, control is affected in a way to be described below.

When power is applied to the instrument, initializer 21 transmits a reset pulse through an OR gate 22 to the ID memory 18 and 4-bit commutator Counter-Decoder 26. The same pulse also is sent through an inverter 36 to reset a flip flop 23. This readies the logic for operation. Depressing "Start" button 24 sets the flip flop 23 enabling output Q. The Q output then opens NAND gate 25 which allows the various stepping pulses, to be described to reach the commutator Counter-Decoder 26. The other $\overline{Q}$ output of flip flop 23 momentarily resets the commutator clock 27 to the beginning of its cycle, and also causes monostable multivibrator 28 to fire once. This impulse from monostable 28 is ORed at 29 into the Counter/Decoder 26 input and sets the counter 26 to the first ID position. Finally, the $\overline{Q}$ output of flip flop 23 opens a gate 30 to enable an audio output amplifier 31 which drives speaker 32. The output of the Counter/Decoder 26 selects or shifts the analog commutator 4 into a selected position in sequence each time it switches its outputs, and causes the ID input to the commutator 4 to be sequentially switched through to the VCO 20. As previously mentioned, it simultaneously gates on the ID clock 17 and causes the ID word to be sent. The VCO transforms the varying analog voltage output of the commutator (in the present case, the ID) into a varying audio frequency tone with a nominal frequency of 1400 Hz. When the ID word is complete or shifted through the generator 19 by clock pulses 17, the word generator signals completion by sending an "End of Word" pulse which is ORed at 29 into the Counter/Decoder 26 clock input, which steps the Counter 26 to the ECG 3 function and switches the commutator 4 accordingly.

After a selected period of perhaps ten seconds determined by a time setting of the commutator clock 27 its first pulse is emitted, which is ORed at 29 into the Counter/Decoder 26 clock input. This pulse terminates the ECG phase and switches the counter to the next ID sequence. The cycle repeats itself as the next ID is transmitted and subsequently ends, causing the Area 14 output to be transmitted, to another ID, the Height 15 output and still another ID to be sent. At the conclusion of the last ID, the Counter/Decoder 26 sends an end of message signal pulse which is ORed at 22 which simultaneously resets the ID memory 18, the Counter/Decoder 26 and the flip flop 23. This in turn actives $\overline{Q}$ which silences the audio tone through gate 30 and resets the instrument to await the beginning of another data sequence.

THE VCO AUDIO SYSTEM

The voltage controlled oscillator VCO transforms into audio tones, the outputs of the various channels of the commutator 4. The frequency of the tone is proportional to the amplitude of applied analog voltage. The audio tones pass through gate 30 to amplifier 31 which delivers the tone to speaker 32. The speaker in turn couples the tone accoustically to the telephone 33 microphone 33', hence sending the data to the remote clinic where it is demodulated, recorded and analyzed.

The following is a description of the circuits used in the apparatus of FIG. 1.

HIGH SPEED ELECTRO-CARDIOGRAM ECG PREAMPLIFIER

Figure 1A:
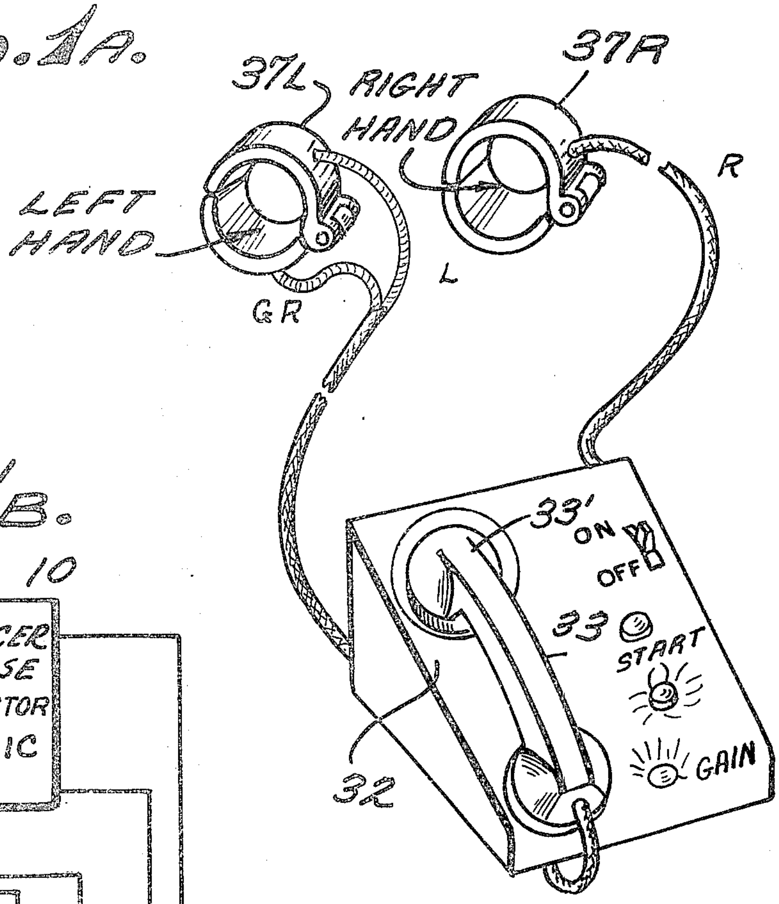
FIG. 1A illustrates a plan view of the apparatus of the present invention with the patient, in "Lead I" configuration.
Figures 2, 3:
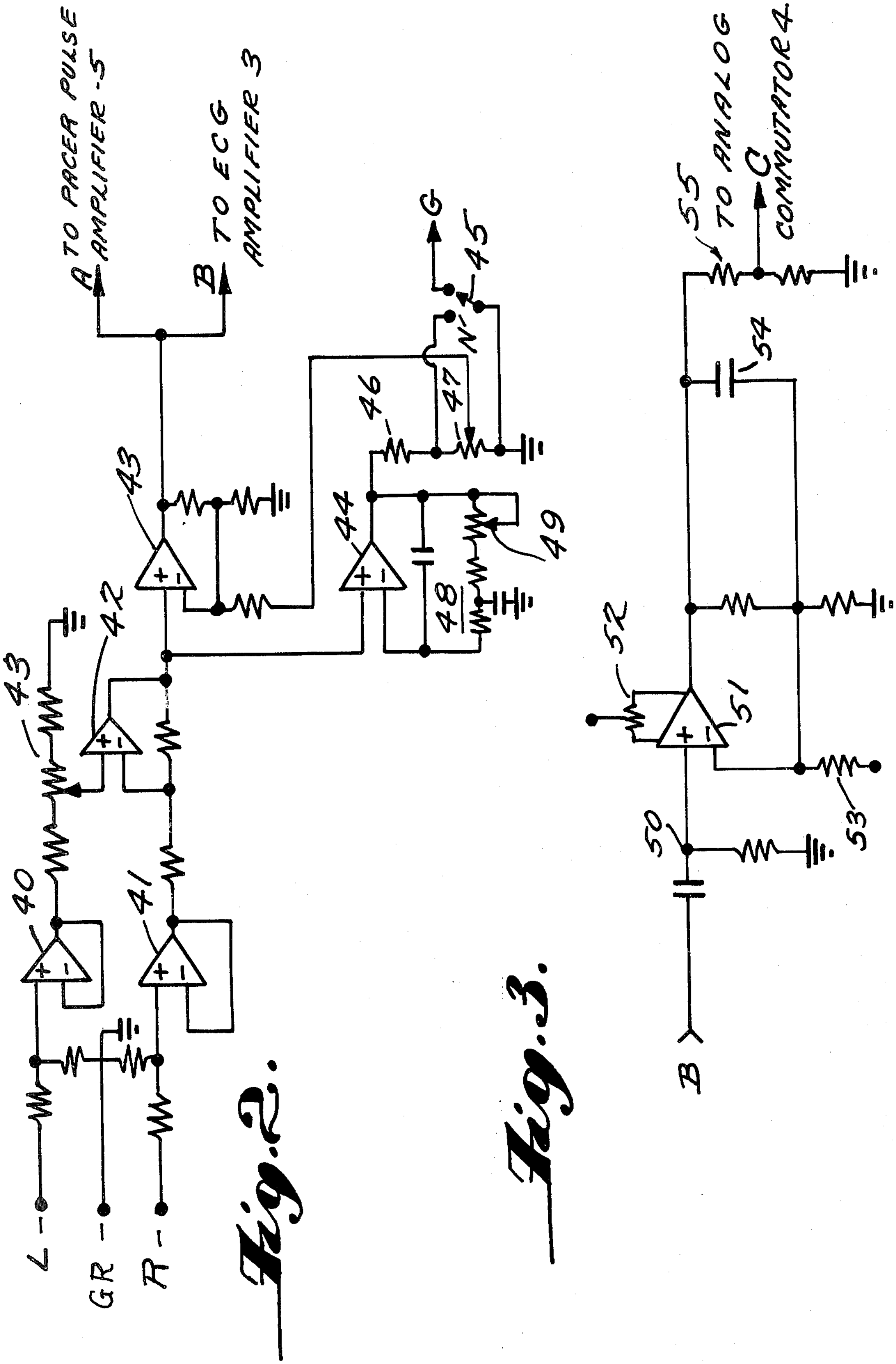
FIG. 2 is a detail of the high speed electrocardiograph (ECG) shown in FIG. 1.
FIG. 3 is a detail of a conventional ECG used in the embodiment of FIG. 1.

The schematic wiring diagram of the high speed ECG preamplifier is found in FIG. 2. It is through this circuit that the actual electrical connection to the patient is made. This connection is made by way of the three patient electrodes L, G and R. Attachment to the patient may be made in any of a variety of ways, as previously mentioned, but typically it is made in the conventional lead I mode. That is, the active electrodes L and R are connected to the patient's left and right arms respectively, usually at the wrists, according to standard medical convention. The patient ground electrode G is generally attached to one of the same limbs as one of the active electrodes except the connection is on the opposite side thereof. For example, in FIG. 1A the usual connection scheme is illustrated, one active electrode is attached to each wrist by means of a wrist clamp type electrode 37R and 37 (L-G) respectively. The ground electrode G is then attached to the opposite side of one of the wrists being held in place by the same wrist clamp 37 (L-G) assembly. Research has shown that this close proximity of the ground electrode to an active electrode will not change the pacer impulse parameters measured by more than 1 or 2 percent with respect to a system where the patient ground lead G might be connected to some more remote portion of the body.

It has been found, in situations where the electrical noise ambient is high, that the connection of a second patient ground, not shown in FIGS. 2 or 3, but essentially parallel with the patient ground G, can in extreme cases reduce the effect of this interference on the cardiac pacer measurements. However, if this second ground electrode is attached to the opposite side of the other wrist in the same manner as the first patient ground, that is to say there is a ground electrode on each wrist and an active electrode on each wrist, a noticeable modification of the impulse waveform parameters will occur. Specifically the impulse amplitude will be reduced approximately 16 percent from the single ground configuration and a decided slowing of the rise time of the leading edge of the cardiac pacer impulse is seen. The latter effect is reflected principally in a reduction of the area under the cardiac pacer curve. Consequently, when double grounding is required, appropriate compensations must be made in whatever computer analysis is conducted on the measured parameters.

In any case, the active electrodes L and R pick up the electrical impulses of both cardiac pacer and heart from the skin of the patient and route these signals to two unity gain amplifiers 40 and 41 which function primarily as impedance transformers providing the overall preamplifier 1 with an input impedance in the order of 44 M ohms.

The signals from amplifiers 40 and 41 are delivered to amplifier 42 which is a conventional unity gain differential amplifier with a balanced input. A potentiometer 43 allows the balancing of the input for maximum rejection of common mode noise. The output of amplifier 42 is delivered to amplifier 43 which has a gain in the order of 5 plus.

If excessive 60 Hz noise is present in the input to amplifier 43 then amplifier 44 may be enabled by moving switch 45 to the G position, thereby coupling amplifier 44 to amplifier 43. This amplifier employs a 60 Hz notch filter feed-back network shown generally at 48. When enabled, amplifier 44 delivers a signal, proportional to the 60 Hz component present at the non-inverting input of amplifier 43, to the inverting input of amplifier 43 by way of the resistor 46 and potentiometer 47.

By adjustment of a potentiometer 49 in filter 48, amplifier 44 can be tuned to precisely 60 Hz. By adjustment of potentiometer 47, the amount of adjusted 60 Hz component can be adjused to exactly cancel any 60 Hz component available attempting to find its way through amplifier 43. Hence, when the amplifier 44 is engaged, it and amplifier 43 function as a 60 Hz notching filter with a Q of approximately 10 and a gain of 5. Otherwise when switch 45 is at the N position 43 acts as a conventional amplifier with a gain of 5.

The output from amplifier 43 is split and is conducted to point A (see FIG. 1) where it provides the input to the pacer pulse amplifier 5 and to point B where it provides the input to the conventional ECG amplifier 3.

THE ECG AMPLIFIER

The illustrative diagram of the ECG amplifier 51 is found in FIG. 3. The ouput from the preamplifier of FIG. 2 enters the circuit at point B and is AC coupled thereto by means of the RC network 50. A potentiometer 52 allows for the cancellation of internal offset of bias in the amplifier, while the addition of negative voltage through a resistor 53 to the inverting input deliverately produces a positive offset of approximately 2.5V at the output of amplifier 51.

The purpose of this offset is so that the baseline of the electrocardiagram will be at center scale when read out at the decoding device at the clinic. This is necessary because the electrical impulses produced both by the heart and by the cardic pacer may be either positive or negative going.

The gain at the output of amplifier 51 at low frequencies is in the order of 200, while the presence of capacitor 54 in a feed-back network causes the amplifier 51 to have a high frequency roll off of approximately 3*d*B at 100 Hz.

Even though the output voltage at the output of amplifier 51 is nominally plus 2.5 volts, it is possible for transient excusions induced by motion in the patient or a physical disturbance of the patient electrode wires, to exceed ± 10 volts.

Such extraordinary excursions would cause a disruption of the analog commutator 4 which follows the circuit. Accordingly, this problem is overcome by the insertion of a 10 to 1 divider 55 which reduces the entire voltage output of the amplifier by a factor of 10 at its final output point C. Hence, the net gain of the amplifier is only 20; however, transient voltage variations are limited to about ± 1 volt.

The output branch A of FIG. 1 is fed to pacer pulse amplifier 5 of FIG. 4, described below.

PACER PULSE AMPLIFIER

Figure 4:
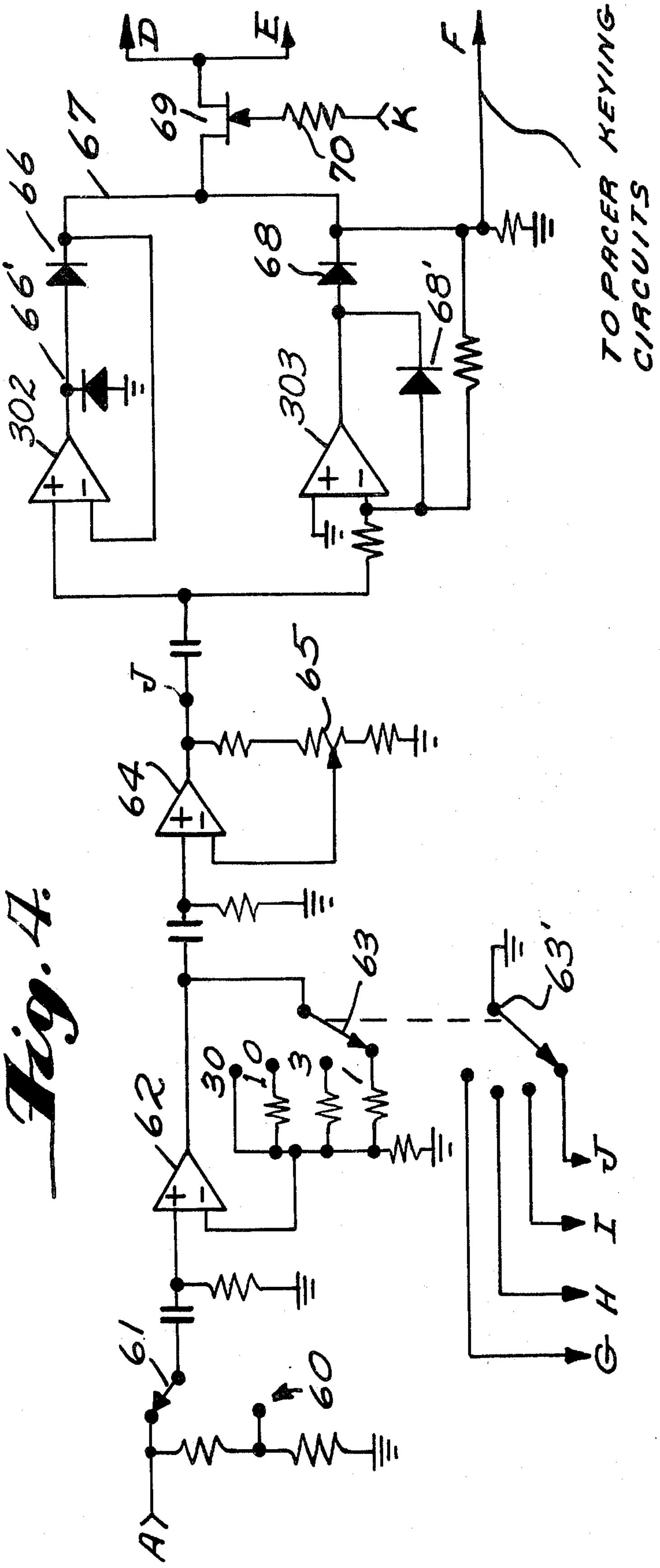
FIG. 4 is a schematic of the pacer pulse amplifier shown in block form of FIG. 1.

The illustrative diagram of the pacer impulse amplifier is shown in FIG. 4. The signal enters from the preamplifier of FIG. 2 at A and encounters a selectabble divider 60 controlled by a switch 61. This allows the amplifier to be operated at normal gain, or at a gain reduced by a factor of approximately 100, depending on the setting of the switch i.e. either directly to A or through the circuitry 60 respectively. The other gang on this switch, 61, is found in FIG. 2. When switch 61 is set to reduce the gain of the pacer amplifier, by the nominal factor of 100, the other gang 45 in FIG. 2 disables the 60 Hz notch filter (amplifier 44) in the preamplifier to avoid excessive ringing. Simultaneously, the identification code system 18 is apprised of the actual position of the switches 45–61 and 6, as shown by the chain line of FIG. 1. From switch 61 the signal passes to amplifier 62 the gain of which in this embodiment is selectable in four steps by means of switch 63. These gain steps are selected nominal valves of 1, 3, 10 and 30. Switch 63' ganged to switch 63 signals the identification memory 18 shown in FIG. 1 as to the position of the gain setting.

The pacer signal passes from amplifier 62 to amplifier 64, which has a nominal gain of about 22. The precise gain setting is controlled by potentiometer 65 which acts as the overall system calibration adjustment.

Amplifier 302 is a non-inverting unity gain amplifier which has a pair of diodes 66–66' inserted in the output. Consequently, only positive going signals will occur at 66 from the amplifier 302. However, since feedback for this amplifier is obtained from point 66, the feedback path includes the effect of the forward resistance of the diode 66 and insures that the voltage level at 66 is always the same as any positive voltage at the positive input of amplifier 302. This branch of the circuit then takes all positive going signals and delivers them undistorted to output 67. Negative going signals cause the amplifier 302 to try to go into negative saturation. The series diode at 66 prevents any negative current from following back from 67, while the shunt diode 66' holds the amplifier output at about −0.7 volts.

On the other hand, an amplifier 303 represents the inverter version of the same ideal diode circuit above. Here, the operational amplifier 303 is connected similarly as a unity gain invertor with the pair of diodes 68–68' again appearing in the output and feedback circuits. As a result, any negative signal which is applied to the input of 303 is inverted and delivered undistorted to lead 67. However, positive going input signals cause the amplifier to try to go into negative saturation which is again inhibited from reaching output lead 67 by the diode array 68–68'.

In effect then, amplifier 302 delivers positive going signals to lead 67 and is inoperative or negative going signals, while amplifier 303 inverts and delivers, as positive signals to lead 67, all negative going signals applied to its input and is inoperative on positive going signals.

The net result is that the system comprises of amplifiers 302 and 303 represents an ideal absolute value circuit whish is substantially free from all signal distortion.

The output lead 67 is delivered to point F and from there to subsequent pacer keying circuitry described further, and is also delivered to a sampling gate 69 which is keyed from point K, through resistor 70, and delivers the sampled signals to points D, E.

PACER PULSE SELECTOR

Figure 5:
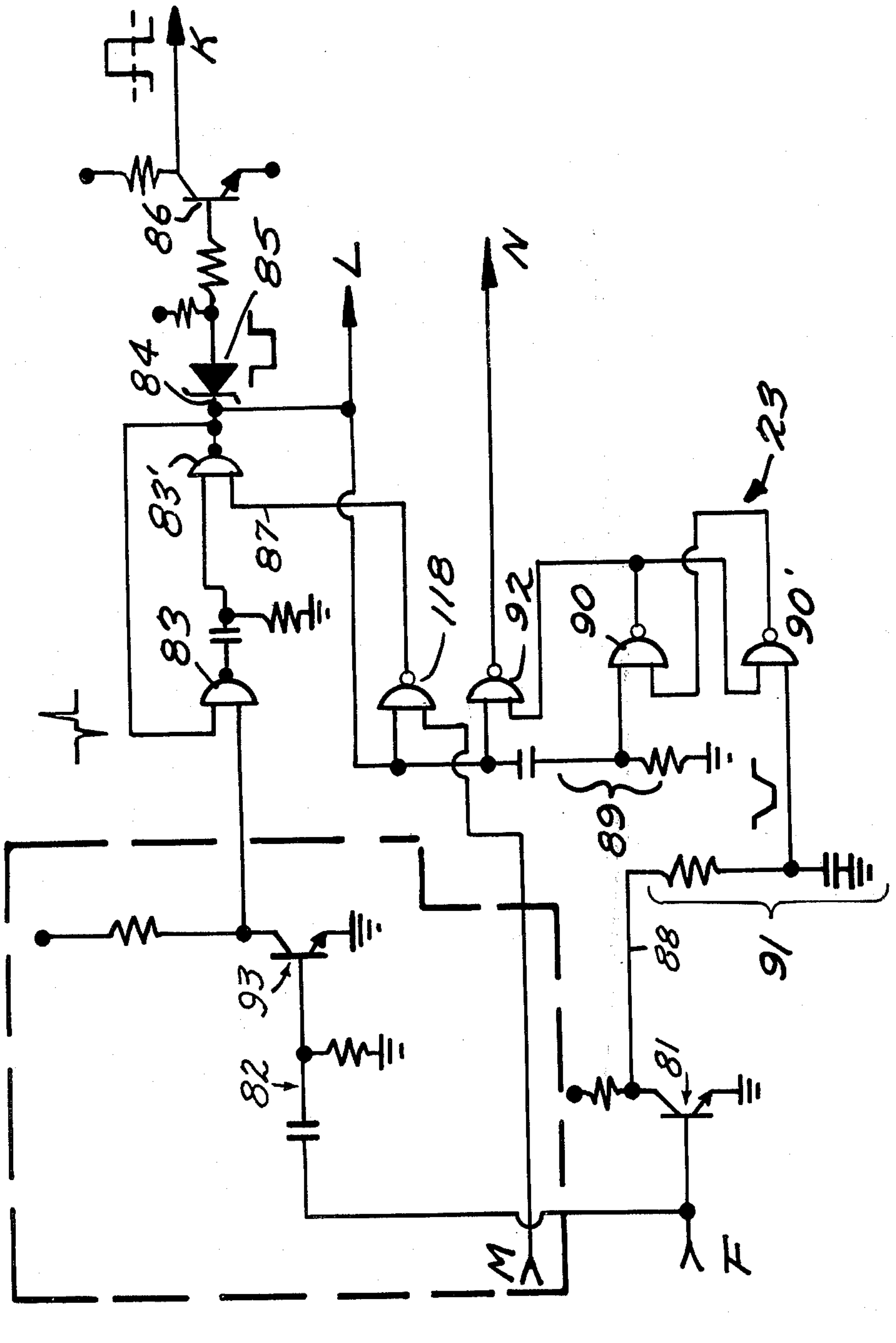
FIG. 5 illustrates in schematic form the pacer pulse selector 10 of FIG. 1.

The schematic wiring diagram illustrative of the pacer pulse selector 10 of FIG. 1 is found in FIG. 5. The pacer pulse from point F of FIG. 4 is branched to two amplifiers 81 and 93. The input of amplifier 93 is derived from differentiator 82, which has a time constant of approximately 100 us. A gate combination 83–83' represents a one shot multivibrator having 2.5 ms pulse output. This multivibrator 83–83' is triggered by the negative going impulse corresponding to the leading edge of the cardiac pacer spike at 82, if the impulse at F has a risetime shorter than approximately 100 us. If, on the other hand, the impulse appearing at point F has a rise time which is longer than 100 us, the impulse at 82 will be of insufficient amplitude to activate amplifier 93 and trigger the multivibrator 83–83'.

When triggered, 83–83' produces an output pulse at its output 84 which is negative going and with a width of nominally 2.5 ms. The levels of this impulse are those of standard TTL logic blocks. This signal is then delivered to Zener diode 85 and transistor amplifier 86 which produces a 2.5 ms wide impulse, with a high value of nominally 12 volts and a low value of −5 volts, which is used to drive subsequent analog sampling circuits. That is, multivibrator 83–83' generates the basic interval during which subsequent analysis circuitry is activated.

It should be pointed out, however, that the sampling one shot 83–83' will be inhibited from firing, if the logic level at input point 87 is low. This can only occur if the logic levels at the output of one shot 83–83' and point M (width display circuit to be described later) are simultaneously high. If 84 is high this means that the sampling one shot is not firing. The signal input from point M is high only during that period of time that the subsequent hold circuitry is being activated. In this way, if the selector circuitry of FIG. 5 has decided that a cardiac pacer impulse has been observed and is still being displayed (i.e. in HOLD), additional impulses will be inhibited from causing further sampling until the end of the display or HOLD period. The length of this HOLD period is determined by one of two factors. If the impulse delivered through transistor amplifier 93 has a fast enough rise time to cause the sampling one shot 83–83' to fire, the sampling output at 84 is routed through a differentiator 89 and sets two gates 90–90', connected as flip flop 23 of FIG. 1. In other words, 23 will be set if a sample has been taken. If the signal measured during the sample period is to be displayed (HOLD mode), the flip flop 23 must be reset before the end of the 2.5 ms sampling interval.

The cardiac pacer impulse is as used previously is coupled to the transistor amplifier 81 at point F. At the input, this impulse will always be positive going and greater than 1.2 volts, if analysis is to take place. This assures that transistor 81 will fully saturate and produce a negative going pulse at its output 88, hence producing a negative going rectangular pulse at the same width as pacer pulse.

The modified cardiac pacer impulse at the output of transistor 81, at point 88, is delivered to an integrator 91 which is connected to the reset input of the flip flop 23. If the width of the modified cardiac pacer impulse exceeds approximately 250 us 91 will reach a TTL low and the pulse is regarded as a pacer pulse and the flip flop 23 will be reset. The sampling input from one shot 83 and the output of the flip flop 23 are compared in NAND gate 92. If flip flop 23 has been reset before the end of the sampling interval, the output of gate 92 will be high; otherwise it will go low. This signal is delivered to subsequent circuitry at point N. If the impulse at F is shorter than 250 us, it is considered to be noise and flip flop 23 will not be reset and output N will be low. The sampling pulse at 84 is also delivered to point L, which, together with N, form a part of the input to the width measuring and display hold circuitry to be described.

PULSE WIDTH-HOLD CONTROL CIRCUIT

This particular circuit may be achieved by a number of variations, one essentially digital and another essentially analog. Its basic function is to produce the display (HOLD) intervals for the respective area and peak height amplifiers 14 and 15 of FIG. 1, and, to do so in such a way that the length of the intervals that these two amplifiers are displayed is equal to one hundred (100) times the length of the cardiac pacer impulse, as measured at some specific percentage of the peak impulse amplitude.

FIG. *6a* shows the digital form of this circuit. If the pacer pulse selector circuitry 10 (FIG. 1) has found a pulse which meets the rise time criteria for a pacer impulse, the appropriate control signal will appear at point K (see FIG. 5) allowing the pacer impulse to pass from point F (FIG. 4—4B) through analog gate 100 to a comparator 101. Meanwhile, the voltage stored on capacitor 102 is proportional to the peak amplitude of the previous cardiac pacer impulse, since point 0 is coupled to the output of the peak amplitude amplifier 15. By appropriate adjustment of a voltage divider composed of resistors 103, the crossover point of the comparator 101 is established at some fixed percentage of the peak height of the cardiac pacer impulse. During the present pulse, capacitor 102 is charged to the peak height of that pulse. The output of the comparator 101 at point 104 then consists of positive going impulse which is restricted to standard TTL logic levels by zener diode 105, and has a width equal to the pulse width at the chosen percentage amplitude of the original cardiac pacer impulse.

The appearance of the pulse at point 104 causes a flip flop 106 to key a 100 kHz clock 107 into shift register 108 by way of gate 109 and 110. Since the pulse at 104 is presented to the input of the shift register 108, it is read in as a series of highs. As the clock 107 frequency is 100 kHz, each storage location in the shift register represents 10 us of time. Once the impulse at 104 goes low, of course, the shift register begins to read in lows.

The pulse is allowed to propagate down the shift register until it finally appears at the output 111. The appearance of the first high at point 111, corresponding to the leading edge of the pulse that has propagated through the register 108, causes a reset impulse to be sent through a NOR gate 112 to reset flip flop 106. This causes the shift register clock frequency to switch from 100 kHz to 1 kHz. That is, flip flop 106 is reset enabling gate 113 with the Q output and disabling gate 109.

The new clock frequency is derived from the 100 kHz clock by two divide by ten circuits 114 and 115 which are switched by flip flop 106 through gates 113 and 110. As a result, the pulse stored in the shift register 108 is now read out of the shift register, through point 111, at a rate 100 times slower than it was read in. Hence, the width of the original cardiac pacer impulse is expanded by a factor of 100, thus compressing the necessary transmission bandwidth by the same factor.

This expanded impulse is delivered through and inverted at 116 to gate 117 together with the reset $\overline{Q}$ output from the flip flop 106. The output $\overline{Q}'$ will be negative only during an approximate 2.5 millisecond interval required for the leading edge of the modified cardiac pacer impulse to travel from the input to the output of the shift register 108. This interval of time, of course, corresponds to the sampling interval.

The output of gate 117 is a positive going pulse which is equal in length to 100 times the cardiac pacer impulse plus 2.5 milliseconds. This is delivered to point M which returns to the pacer pulse selector 10 and gate 118 shown in FIG. 5. This signals the sampling one shot 83—83' that a (HOLD) interval is in progress and inhibits further samplings during this interval. The output at 117 is also delivered to the level shift circuit 119 which provides the output P which drives the subsequent hold gates.

If the original signal gated into the comparator 101 has been found to be an unlikely pacer impulse candidate, having failed the width criterion of the pacer pulse selector, a negative going edge will arrive at point N (see FIG. 5) and will be inverted and differentiated by respective circuits 120 and 121 leading to a positive going spike at point 122. This impulse will be delivered to the reset input of the shift register 108, causing it to reset to all zeroes, and to the OR gate 112 which will reset flip flop 106 causing Q to go high and forcing the output $\overline{Q}$ low. This event will occur at the conclusion of the sampling interval and will cause the area and height displays to be returned to zero after only 2.5 ms.

Figure 1B:
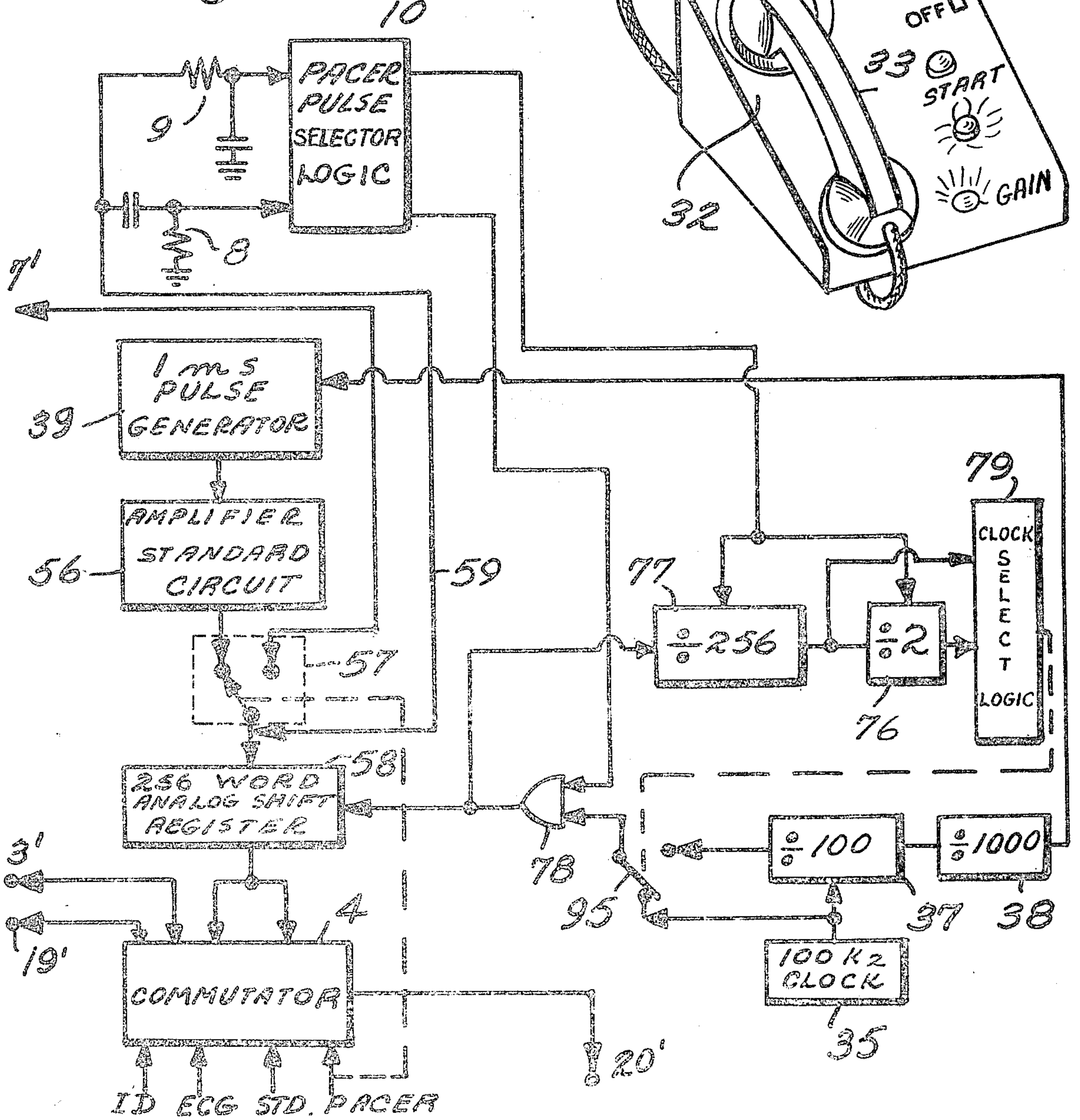
FIG. 1B shows an embodiment of FIG. 1 utilizing time expansion for signal transmission purposes.

In accordance with the above mentioned concept FIG. 1B shows yet another embodiment of the apparatus previously described with respect to FIG. 1. However, this modified version describes a method and apparatus for transmitting the actual pacer pulse to be analyzed to the central location.

The embodiment shown in FIG. 1B of the system transmits the waveform of the pacer monitor and preserves the other characteristics of the unit disclosed in FIG. 1. It does, indeed, transmit impulses which are proportional to the amplitude and width of the cardiac pacer pulse and the area can also be derived. The essential difference is that the waveform which is transmitted by the unit of FIG. 1B is an accurate reproduction of the original cardiac pacer waveform, with the exception that its frequency spectrum has been reduced by a factor of 100, by expanding the time scale by that same factor.

Since the other portions of the pacer analyzer have been previously described, an explanation of the function of the modified analysis circuitry will be presented.

Inasmuch as all the cardiac pacer waveform information is transmitted simultaneously, it is unnecessary to have two distinct transmission intervals carrying cardiac pacer information. In other words, the area and height transmission sequences are combined into one transmission which encompasses both the factors. Since it is highly desirable to make measurements with some considerable accuracy through the system, the "spare" data sequence, originally used for area, has been incorporated to transmit a series of standard impulses instead.

These standard impulses are rectangular pulses of accurately controlled one millisecond width at a standard amplitude. They are transmitted at a rate of 100,000 times slower than an internal 100 KHz clock 35. These reference pulses permit the computer which is conducting the data analysis at the central clinic to adjust the data delivered to it in accordance with any variations in calibration introduced at any point in the transmission path.

The reference pulses are initiated by the 100 KHz clock 35 whose signals are delivered to two frequency dividers 37 and 38 which have a total division ration of 100,000. The output pulse from 38 is approximately 1 per second and is delivered to a 1 ms pulse generator 39. This generator develops a precisely controlled 1 ms wide impulse and delivers it to the amplitude standardization circuit 56 which references the impulse amplitude to a precision standard.

The cardiac pacer impulses derived from the positive pulse selector 7 and the reference pulses from standardization circuit 56 are delivered to the two inputs on a switch 57 which is actuated by the commutator selector inputs. Switch 57 is in the reference pulse position whenever the pacer output or C4 of the commutator decoder 26 is not activated. On the other hand, when the pacer output C4 of 26 is activated, the switch 57 is pulled into the pacer pulse position. The output of switch 57 is delivered to the 256 word analog shift register (bucket brigade) 58.

These pulses are also routed to the pacer pulse selector logic 10 via lead 59 which is similar to that previously described. The only exception being that this circuit is operated with the "non-pulse width hold" variation described in FIG. 6C. When either a reference or pacer pulse is sensed by the pacer pulse selector logic 10 a short pulse is emitted by the sample lead which resets counters 76 and 77. The hold line is also activated and opens gate 78. This allows 100 KHz clock 35 pulses to flow to the bucket brigade 58. These clock pulses are also routed to counter 77 which produces an output pulse when the 256th word has been read into the bucket brigade 58 signifying that it is full. This output pulse of counter 77 is routed to clock selector logic 79 which immediately switches from the 100 KHz clock 35 to a 1 KHz clock formed by the original clock 35 and a divide by 100 circuit 37 via switch 95. Consequently, the waveform stored in the bucket brigade 58 is shifted out at a rate which is 100 times slower than the input rate. This slowed down output waveform is then delivered to the analog commutator 4 in the normal way.

Counter 77 continues to count clock pulses and, when it reaches 256 for the second time, counter 76 emits a pulse to the clock selector logic 79 signifying the end of the data storage transmission sequence. This causes the clock switch 79 to revert switch 95 to the 100 KHz position of clock 35. This event will be approximately concurrent with the end of the impulse applied to the Hold line which will then close gate 78. The overall effect is that, depending on the position of switch 57 each time a pacer or reference pulse is sent by logic circuit 10, 2.56ms of data is clocked into the bucket brigade 58 at the high speed rate and then clocked out at the slow speed rate. Since the bucket brigade 58 is, in effect, an analog shifter register, the output delivered to the commutator 4 is a faithful reproduction of the original impulse waveform. Its peak amplitude is proportional to the peak amplitude of the pacer or reference pulse. The widths are proportional to 100 times the width of the original pulses, thus reducing the frequency spectrum by 100 from that of the original impulse. Proportional areas may be obtained by integrating the waveforms and interval timing may be obtained by timing the interval between successive impulses.

In the event that the pacer selector logic 10 concludes that the impulse sensed was noise rather than a desired impulse, the Hold line will be deactivated after approximately 250 microseconds. This closes gate 78 long before the normal end of the storage sequence. This inhibits all further action by the bucket brigade clocking circuit 58. Since the clock pulse counting scheme of 76 and 77 will be initiated from 0 when the next desired pulse is sended, what ever noise information is stored, will be read out of the shift register at the high speed rate during storage interval of the succeeding pulse and discarded. It should be realized that each of the previously described systems of FIG. 1 and FIG. 1A may each be modified so as to be compatible with the other and the two embodiments are illustrated to show alternate forms of dealing with the signals produced at the remote location.

Figure 6A:
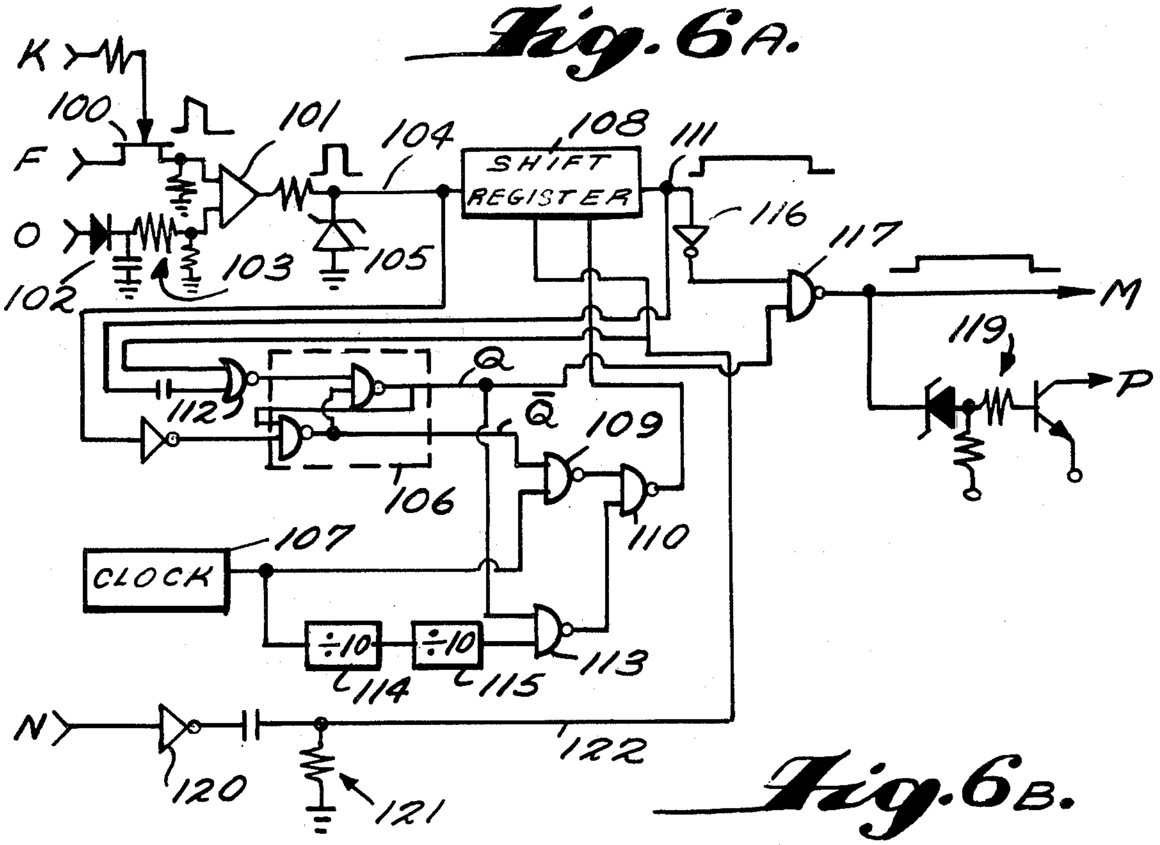
FIGS. 6A-B-C are various forms of the pulse width hold control circuit.
Figure 6B:
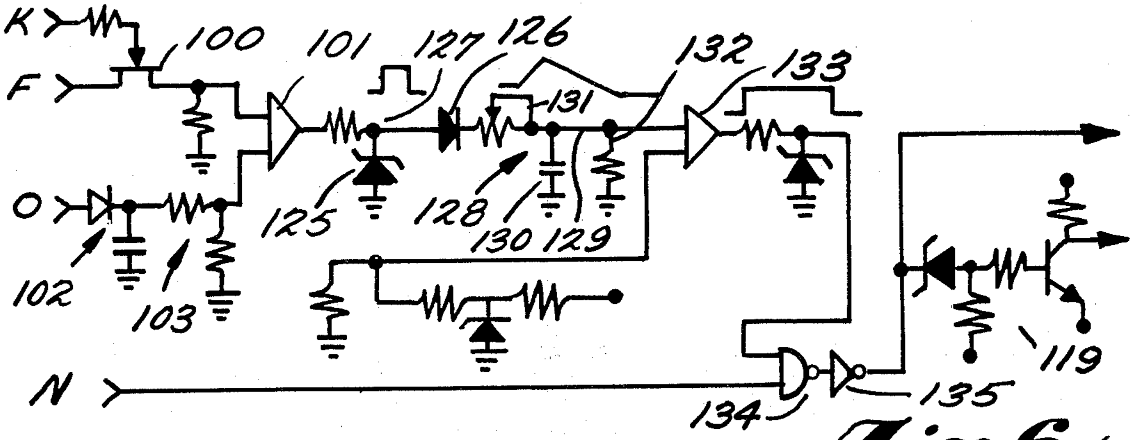

The analog version of the pulse width HOLD control circuit is found in FIG. 6B. The function of the inputs from F, K and O is the same as before except the comparator 101 output is no longer required to be at TTL logic levels. It will in fact have a low value of approximately −0.6 volts and a high value of approximately 5.6 volts as determined by zener diode 125, irrespective of the actual cardiac pacer impulse level. The width, of course, is the same as that width of the cardiac pacer impulse at the chosen percentage of maximum amplitude.

The reason for the choice of 5.6 volt zener at 125 is two fold. First of all, zero temperature coefficient zeners are available at near that voltage, and secondly, the higher working voltage for this circuit will insure that minimum distortion is caused by the use of a silicon diode 126 in series with the signal path.

In principle, this overall circuit functions in the following way. At point 127, an impulse of constant amplitude is produced. While the amplitude of the pacer pulse is normalized the width remains precisely the same as that of the cardiac pacer impulse, and is delivered through diode 126 to an integrator network 128 composed of a resistor and capacitor. In this way, a voltage is impressed at point 129 which, at the trailing edge of the modified cardiac pacer pulse, will be proportional to the area under the modified cardiac pacer impulse curve. It should be noted that since this modified pulse is rectangular and of standard amplitude, this area is proportional only to the width of the impulse.

Following the trailing edge of the impulse, capacitor 130 begins to discharge through resistor 132, as the diode 126 inhibits discharging through resistor 131. The charge and discharge resistors 131 and 132 respectively are chosen to be in the ratio of approximately 1 to 100; with resistor 131 being adjustable for calibration. The voltage at the output of integrator 128 is delivered to the noninverting input of a second comparator 133. A positive going impulse commences when the voltage on the charging capacitor 130 exceeds about 0.05 volts, and, ends much later when the slowly discharging capacitor 130 causes this voltage to pass down through 0.05 volts. This level is established by the bias and the inverting input to comparator 133.

By appropriate adjustment of the values of the resistors 131 and 132, the output of the comparator 133 can be set to about 100 times that of the input of the cardiac pacer impulse. This expanded output of comparator 133 is compared in gate 134 with the input from point N which comes from the pacer pulse selector 10. If the pulse originally applied to point F has satisfied the pulse width criterion for the cardiac pacer pulse, the logic level at N will be high, causing gate 134 to open and pass the expanded pulse from comparator 133 through an inverter 135. From here, the pulse is routed back to the pacer pulse selector, through M and to a level shift circuit 119 as shown in FIG. 6A to drive the (HOLD) gates 12 and 13 (see FIG. 1).

input the input impulse at F did not meet the criterion, N will be low, closing the gate 134 and terminating the (HOLD) interval at the close of the sampling interval of 2.5 milliseconds.

Figure 6C:
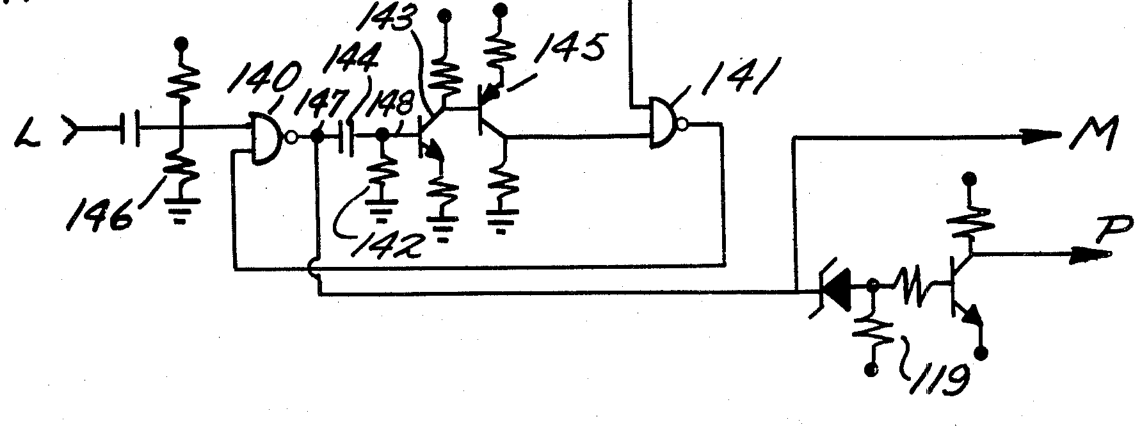

In reality, still a third variation of the HOLD circuit exists. For those cardiac pacer where the measurement of pulse width is not considered an important parameter, the pulse width measuring function of the whole circuit can be supplanted by a one-shot multivibrator which generates its own internal pulse of a fixed width; such a circuit is shown in FIG. 6C.

Here the NAND gates 140 and 141 function as a one-shot multivibrator. They are in a circuit which is basically similar to conventional NAND one shots, with the exception that some circuit modifications have been made such that it is possible for the gate one shot of FIG. 6C to have a period in excess of 100 milliseconds.

Generally, the period of monostables of this sort is limited by the fact that the timing resistor must have a valve less than 470 ohms. This is due to the tendency of TTL gate inputs to float "high" if the value of the input terminating resistors are not below this value. The timing, or input terminating resistor in the conventional circuit is analogous to the resistor 142 in the circuit shown.

In this modified circuit, the timing resistor 142 can have any practical value limited largely by the input inpedance of the subsequent transistor 143. The interval of the one shot is determined by the total timing network consisting of capacitor 144 and resistor 142. This RC network charges across the base of transistor 143, which, with transistor 145, forms a complementary pair with an output impedance of approximately 200 ohms. This two-transistor amplifier is a noninverting impedance transformer which allows the timing network to be of the high impedance variety, allowing for long intervals with reasonable value of capacitance at 144. At the same time, it permits the input terminating resistance of gate 141 to be on the order of 220 ohms.

The overall circuit functions in the following way. The negative going leading edge of the sampling impulse, from the pacer pulse selector 10, enters at point L and is capacitively coupled to the input of gate 140. This input is normally held at TTL logic high level by resistor divider network 146. However, the negative going edge momentarily forces the input of gate 140 low, which if the one shot is in the quiescent state, forces point 147 high causing capacitor 144 to charge through resistor 142. This results in the voltage at point 148 (the output side of capacitor capacitor going immediately high and then slowly decaying back to zero.

Although the transistors 143 and 145 are saturated during most of this time, the effect is that a TTL high is delivered to the input of gate 141, at the collector of transistor 145. When capacitor 144 has sufficiently discharged, such that the voltage at the point 148 has dropped below the transistor threshold for transistor 143, the voltage at the collector of 145 returns to zero. With the RC values specified, this time interval is typically 120 milliseconds.

The output condition of gate 141, then, depends on the level present at the input N from the pacer pulse selector. This level will always be high during a sampling interval. Consequently, the output of gate 141 will always be low during a sampling interval. If the cardiac pacer impulse has met the time width criterion, the level at N will remain high and the output of gate 141 will remain low for normally 120 milliseconds, at which point it will reset at its quiescent condition, which is high. If the impulse has failed to meet the pulse width criterion then N will go low at the conclusion of the 2.5 millisecond sampling interval, thereby forcing gate 141 back high and returning the monostable to its quiescent state.

The output for the entire circuit is taken from point 147 (i.e. the output of gate 140) which is for all practical purposes, the inverted wave form from gate 141. This positive going pulse is delivered to point N and to the level shift network 119 in the same manner as the preceding circuits.

When this option is exercised, the output of the area and peak height amplifiers is displayed for 120 milliseconds, independent of the width of the cardiac pacer impulse. Those impulses which are sampled, but are not likely cardiac pacer pulses, have their displays terminated after 2.5 milliseconds.

PEAK AMPLITUDE AMPLIFIER

Figure 7A:
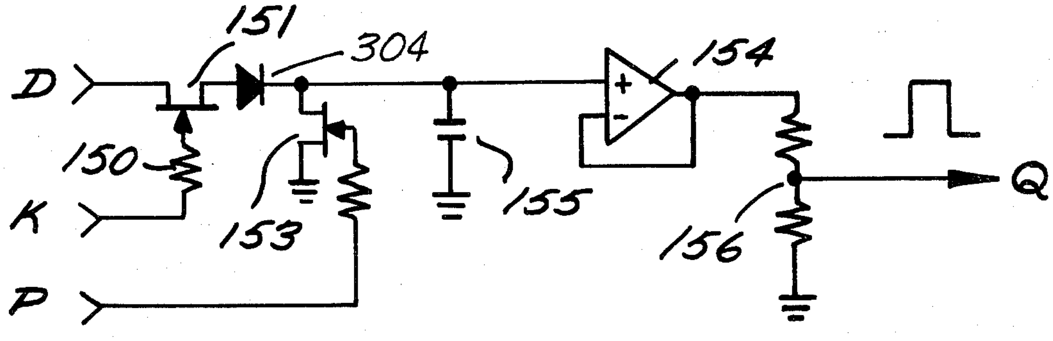
FIGS. 7A-B-C are variations of the peak amplitude amplifier of the present invention.

This amplifier, which is essentially a SAMPLE and HOLD amplifier, senses the peak pacer impulse amplitude and has a number of forms. A first form of the amplitude is shown in FIG. 7*a*. In this circuit, the positive going cardiac pacer impulse from the pacer pulse amplifier shown in FIGS. 4-4A enters at point D. If the pacer pulse selector of FIG. 5 decides to admit the pulse to the amplifier point K will go to approximately +10 volts. The high resistance of resistor 150 will cause a few $\mu a$ of forward bias current to flow in FET gate 151. This will turn the gate on and admit the pacer pulse to the circuit.

The use of the high positive bias at point K with a high series resistance, 150, insures that the FET 151 gate will remain turned on irrespective of signal voltage swings of up to several volts positive.

Due to the voltage drop in 150, the voltage at the gate itself will be approximately 0.7 volts higher than the signal voltage in the channel of the FET 151. Consequently, irrespective of the voltage swings in the channel, the depletion barrier will be destroyed and the gate will remain turned on.

Simultaneously with the opening of the Sampling gate 151, the HOLD gate 153, which normally clamps the input of amplifier 154 to ground, is closed. This is done by the application from point P of a level of approximately −5 volts. This level is delivered by the Pulse Width-Hold Control circuit (see FIGS. 6A-6B), and effectively reverse biases the FET gate 153, turning it off.

With this clamping removed, and with the opening of the Sampling gate 151, the pacer impulse is allowed to pass through silicon diode 304 to the sampling capacitor 155. The diode 304 and the capacitor 155 function in such a way, that once the impulse charges the capacitor to its highest value, the voltage found on that capaacitor will correspond to that peak value. As the cardiac pacer impulse voltage level drops below its maximum value, the diode 304 will become reversed biased and prevent the discharging of the Sampling capacitor 155 from the maximum.

As a result, a voltage, equal to the maximum value of the cardiac pacer impulse voltage, less the forward drop of the diode, remains stored on capacitor 155. This voltage is delivered to the noninverting input of unity gain impedance transformer amplifier 154 and from there to a 10 to 1 voltage divider 156 to point Q. The use of amplifier 154 is to permit the reading of the voltage stored on capacitor 155 without significantly discharging it during the display period. The output voltage at Q has been divided to insure that impulse levels no higher than a volt or so are delivered to the subsequent analog commutator.

The positive voltage at point K, which turns on the Sampling gate 151, remains at that level for approximately 2.5 ms before returning to nominal −5 volts. When it does so, the FET 151 is reversed biased (turned off) and the sampling period is ended. The HOLD gate 153, by contrast, will remain biased off for approximately 129 milliseconds. During this period the peak pacer impulse voltage will remain stored on capacitor 155 and output as a 120 millisecond pulse of some amplitude at point Q. At the end of this period gate 153 will turn on and ground the input to amplifier 154.

Figure 7B:
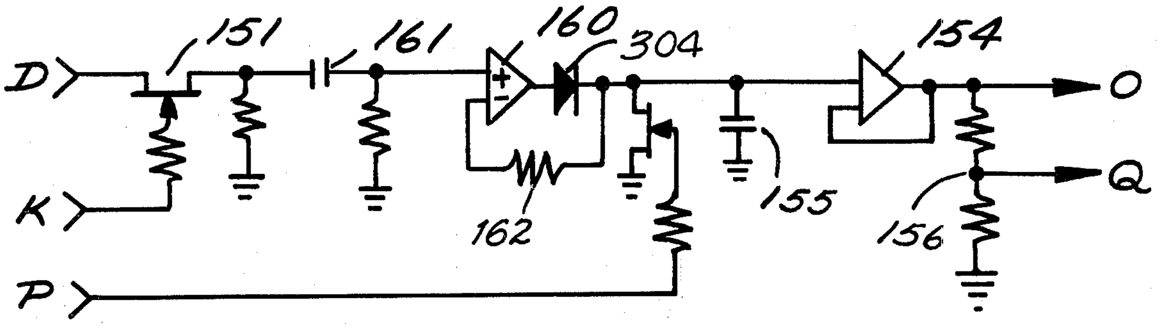

Another embodiment of a sampling scheme is shown in the somewhat more complex circuit of FIG. 7B. This circuit is similar to the one just described, with the exception that an error sensing circuit, comprised principally of comparator 160 has been added, which effectively overcomes the series resistance effects of gate 151 and, also the variable resistance effect of diode 304. The functions of the inputs D, K and P and the SAMPLE and HOLD gates 151 and 153 and their associated circuitry are the same as previously described.

The input pacer pulse from there passes to Sampling gate 151 and is AC coupled through capacitor 161 to the noninverting input of the high speed comparator 160. Since capacitor 155 has been previously held at zero, prior to the release of the clamp or gate HOLD 153, the comparator 160 senses a large error between the voltage applied to the two inputs. Consequently the voltage at the output of comparator 160 is forced to a positive voltage of approximately +10v.

This positive excursion causes a large current to flow through silicon diode 304 thereby charging capacitor 155. Under these circumstances the voltage actually available to charge the capacitor 155 is two or three times the actual value of the cardiac pacer impulse applied to the noninverting input of 160. Consequently, in spite of diode 304, capacitor 155 charges very quickly.

This, of course, causes the voltage on the inverting input, as seen through resistor 162, to rise rapidly toward the value on the noninverting input. Effectively, the applied voltage at the output of comparator 160 will stay at approximately −10 volts until the voltage on the capacitor 155 reaches the same value as that applied to the input of comparator 160.

At the moment that the voltage on the capacitor equals the applied voltage from the pacer impulse, the comparator output will drop off.

Whenever the peak voltage has actually been sensed, all subsequent applied voltages to the noninverting input of comparator 160 will be lower than that value stored on capacitor 155. Under those circumstances, the output of comparator 160 will go to some negative value leaving diode 304 to retain the stored charge on capacitor 155.

Because the comparison time of comparator 160 is significantly shorter than 10 us, the voltage stored on capacitor 155 will reach the peak value of the input pacer impulse virtually instantaneously. Since, until the moment that the input voltage and the capacitor 155 voltage actually match each other, there is a forced potential difference of several volts across diode 304. Therefore, nonlinear effects from this diode are in evidence.

Figure 7C:
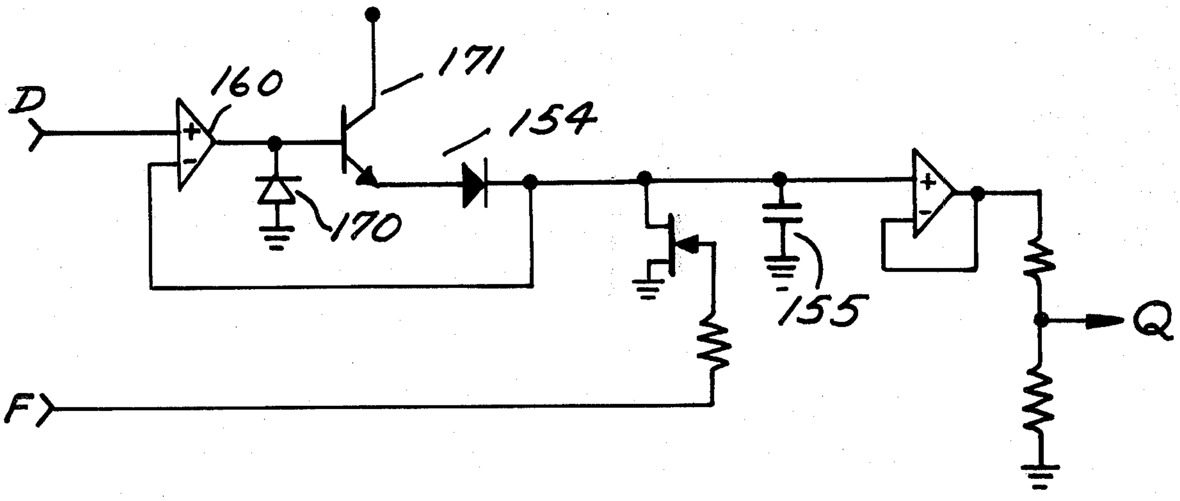

FIG. 7C shows a modified form of the circuit of 7B in another preferred form. This circuit functions in essentially the same way as that of FIG. 7B. The diode 170 improves the speed of the circuit by guaranteeing that the output of comparator 160 is never more than a selected nominal value of about, −0.7 volts. This insures that the transistor 171 does not undergo base-emitter breakdown.

Transistor 171 has been added as a current amplifier to ensure that the sampling capacitor 155 can, in fact, be charged to sufficiently high rate to sample on the leading edge, if required, of the pacer pulse.

It should be recalled that the interval of time that the output voltage is displayed at point Q depends on whether or not pacer pulse selector circuits have accepted it as being that of a cardiac pacer. If so, the width of the pulse at Q will be 100 times as that width of the cardiac pacer impulse. If the nonwidth measuring option is employed it will be instead nominally 120 milliseconds.

On the other hand, if the cardiac pacer pulse circuitry has rejected the impulse the output at Q will disappear after 2.5 milliseconds.

AREA AMPLIFIER

Figure 8A:
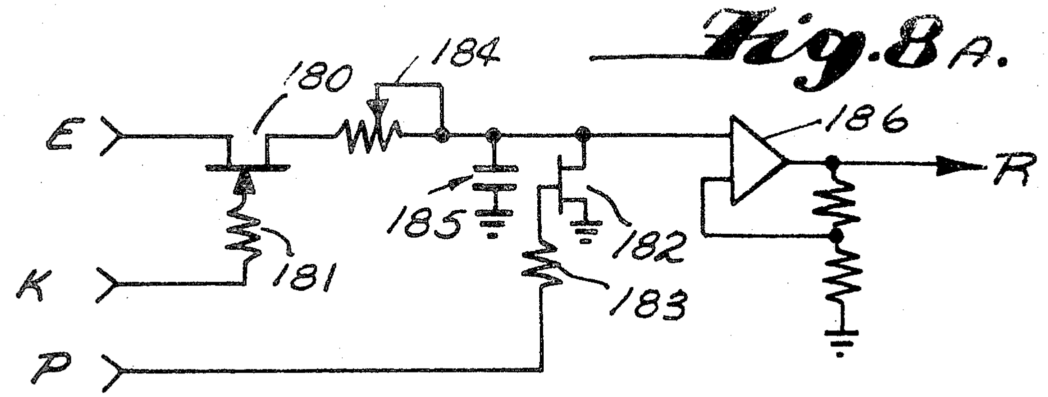
FIGS. 8A-B are circuits showing different embodiments of the area amplifier of the present invention.

This amplifier is shown diagramatically in FIG. 8A. The cardiac pacer impulse arrives from the pacer pulse amplifier 5 (FIG. I) at point E. The Sampling gate 180 and associated circuitry 181 functions principally as that of the amplitude amplifier; likewise, the clamp or HOLD gate 182 and its circuitry 183.

The pacer pulse is sampled for 2.5 milliseconds and delivered to the RC integrating network 184 and 185. This network may have a nominal time constant of 400 milliseconds. Since the avarage pacer pulse is in the 1 to 2 millisecond range this means that significantly less than 1% of the charging curve is used thus insuring high linearity. The high value of resistor 184 also insures that no significant discharge of capacitor 185 can occur after the pacer pulse occurs but before the Sampling gate 180 closes. Amplfier 186 has a relatively high gain of about 20 in order to bring the small voltage sampled on the capacitor 185 to a level which may be delivered to the analog commutator 4 through point R, that is to say, to a nominal 0.5 volts.

Figure 8B:
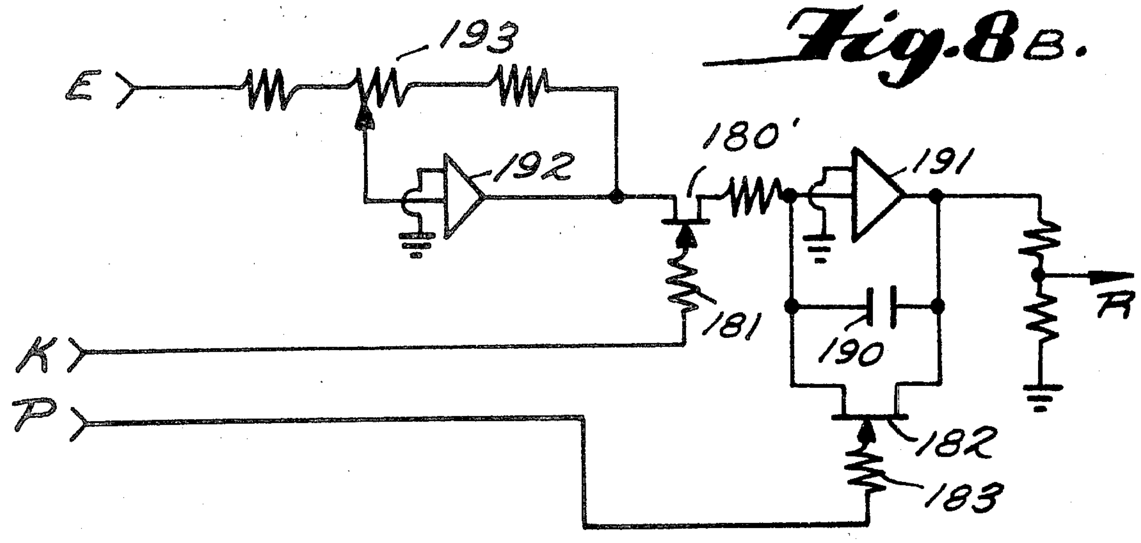

In another embodiment of the area amplifier shown in FIG. 8B the same components are labelled with the same reference numbers. In this particular case, the HOLD gate 182 which is keyed closed, through resistor 183, permits an integration capacitor 190 to remain charged during the holding period. At the conclusion of the holding period the stored charge is shorted through gate 182.

An integration amplifier 191 is preceded by an inverter 192 since a positive going output is desired and the integrator 191 itself inverted any positive going signals, while there are only positive going signals at the system input, point E. This inverter 192 is essentially unity gain, although potentiometer 193 permits the gain to be adjusted, allowing overall calibration of the area circuit. The output of the inverter 192 is delivered through sample gate 180' is a secondary sampling gate which is keyed in unison with the main sampling gate 69 in FIG. 4. In this way, the integration amplifier 191 is disconnected from the inverter 192 and all preceding circuitry during all of the time interval except the actual sampling interval. Consequently, any tendency for offset voltages, due to the preceding amplifiers, to be summed in the integrator is prevented.

Positive going pacer pulses are applied to point E, inverted in amplifier 192 sampled through gate 180' and sent into the integration amplifier 191. This amplifier integrates during the sampling interval at which point gate 180' opens, forbidding further sampling. The output of the amplifier 191 is delivered to the commutator 4 (FIG. 1) through point R. This output is maintained during the HOLD interval, and then returned to ZERO at the conclusion of that interval by the shorting action of gate 182.

ANALOG COMMUTATOR

Figure 9:
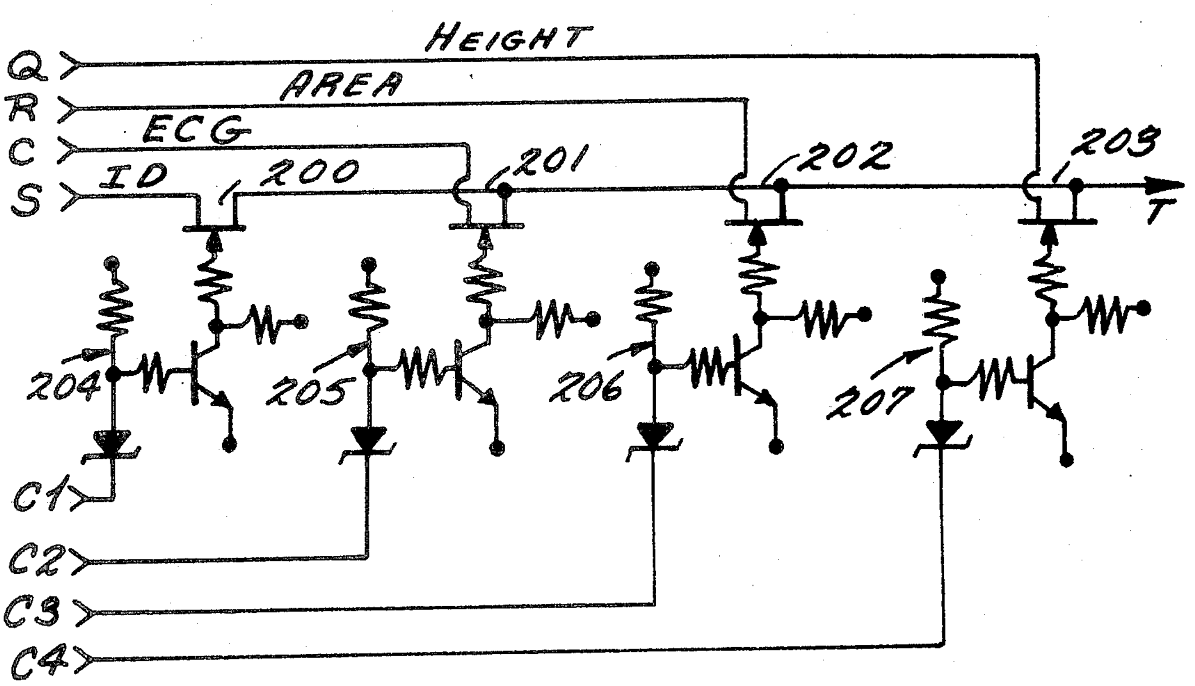
FIG. 9 is an illustration of the analog commutator 4 of FIG. 1.

The various output signals, that is, those from the area, amplitude, ECG and ID channels are not transmitted simultaneously. Rather, they are transmitted in a specific sequence. This data sequence requires the incorporation of a commutator capable of handling analog as well as digital signals. This commutator is shown schematically in FIG. 9.

Basically it is a four-pole, one-position switch which is randomly selectable by the application of the appropriate voltages on the inputs C1 through C4. The actual switching is accomplished by FET analog gates 200-203 comparable to those seen in earlier circuits. These gates 200–203 are driven by a logic level shifter networks 204-207 similar to those seen previously (IE network 119). These level shifting networks allow the FET analog gates 200–203 to be operated by TTL levels applied to the selector inputs C1 through C4.

In normal operation whichever of the analog inputs Q, R. C and S (Height, Area ECG, ID) is to be delivered to the commutator 4, output T will have its corresponding level shifting network inputs C1, C2, C3, or C4 at a TTL logic low while all other level shifter inputs will be held at TTL highs.

The control of the levels of the inputs C1, C2, C3 and C4 is produced by the Commutator Counter-Decoder Logic 26 which has been described in basic form in an earlier section of this disclosure. The input Q, R, C or S which is switched through to the output of the commutator T, proceeds to the VCO system for tone modulation and transmission. Therefore, each time an input C1 - C4 is activated whichever corresponding signals q. R, C or S is present will be coupled through a respective gate 200-203 to output T.

CARDIAC PACER CENTRAL MONITORING CONSOLE

The basic purpose of the Cardiac Pacer Central Monitoring Console (PCMC) is to receive the tone transmissions of the Transtelephonic Cardiac Pacer Waveform Analyzer 210 generally shown described with respect to FIGS. 1 and 1A from telephone lines, radio receiver or whatever mode of relaying the audio information has been employed. Once received it converts these tones to a voltage which is fed to a pen recorder 211 and an electronic counter 212. The entire system is shown in block form in FIG. 10.

The pen recorder 211 then traces out the pulses corresponding to the several ID codes, ECG, pacer impulse area and pacer impulse height with actual pulses produced by the modified device of FIG. 1A. In addition, a standard Binary to BCD converter 213 may be employed to convert the ID pulse to standard digital form. Likewise, while the value of the area and amplitude pulses may be read from the pen recording, a triggered digital voltmeter 214 may be employed to convert these analog numbers to standard BCD form and provide an output to display 215.

An electronic counter 212 makes a precise measurement of the cardiac pacer interval which is displayed visually at 216 and is also available in BCD.

Using the pen recorder and the counter one can decode the basic information and relay it to a computer by hand (e.g., punch cards or teletype).

By employing the full digital decoding system, the console can relay the data directly to the computer without human intervention.

The PCMC includes two basic sub-circuits; a demodulator circuit 217, and an output circuit 218 both of which are presented below. A backup tape recorder 305 is also provided for recording the signals received over the wire or radio link.

Demodulator

The system using the first form of a demodulator is represented schematically in FIG. 11A. The telephone line input is fed to an amplifier 221 which has a gain of about 100. Following amplifier 221 the signal path is divided into two branches. The first branch feeds through a comparator 222 which generates a square-wave output at the same frequency as the incoming tone. This serves as an input limiter to reduce the effect of noise on the detector.

The second branch is fed through a half-wave rectifier 223 and then to a comparator 224 which serves as a squelch circuit to a terminall 311. A description of this operation will follow.

The output of amplifier 222 is fed to a standard phase-locked loop frequency detector 220. This particular arrangement of the phase-lock loop makes the detector insensitive to high noise level input. The output of phase-locked loop detector 220 is divided into two branches. One branch feeds a voltage controlled multivibrator 225 which, in turn, is fed back to an input of phase-locked demodulator 220 as a phase reference signal. The other signal branch goes to a unity gain amplifier 226 which acts as a buffer between the detector 220 and a filter 227 through to a terminal 312. The filter 227 response allows true reproduction of ECG and pacer pulses while inhibiting carrier frequency noise since it has a sharp roll-off at about 800 Hz.

Referring now to FIG. 11B the second form of the demodulator is described. The telephone input is fed directly into the amplifier 221 as above. Following this amplifier the circuit is the same as the circuit of FIG. 11A in as much as the comparator 222 and squelch components 223-224 are concerned. The differences, however, are explained below.

The output of amplifier 222 is fed to an amplifier 230 which improves the rise time of the square-wave output signal of amplifier 222. Following amplifier 230 the signal path is divided into two branches; one branch going directly to a differential amplifier 231 after passing through a sawtooth generator 232. The other branch from amplifier 230 goes to an inverting amplifier 233 first, then on through sawtooth generator 306 and onto differential amplifier 231.

Amplifier 237 delivers a square-wave output which is invented at amplifier 234 and full-wave rectified by the bridge 235. The rectified dc voltage from bridge 235 is then proportional to the frequency proportional the charge-discharge rate of selected timing characteristic of generators 232 and 306.

The dc from bridge 235 is fed to a variable gain amplifier 236 which in turn feeds a 60 Hz passive notch filter 239 and on to the final amplifier 238. These last two amplifiers, 236 and 238 are used to match the input-output impedences of the 60 Hz filter 239.

Referring to FIG. 11C, following the filter 227 (FIG. 11A) or the amplifier 238 (FIG. 11B) the signal at terminals 311 and 312 separates into a number of branches in the output circuit of FIG. 11C.

One branch runs through a fubber amplifier 239 of unity gain the output of which is used to drive frequency or rate counter 212.

A second branch runs through an inverting amplifier 240 with a gain of nearly 1. The output of amplifier 240 runs through a differentiator 241 and transistor switch 242 which triggers a Gate 243A.

Another Gate 243B is opened after receiving a positive dc voltage of at least the predetermined amount from the squelch amplifier 224. The squelch 224 delivers the dc voltage only after an initial ID tone is received. Ramdon noise or voice signals will not trigger the squelch 224.

After the Gate 243B is opened by at least a 1 second tone signal, it in turn gates the transistor switch 244 opening the signal path from the filter 227 to amplifier 248. The Gate 243A, as previously mentioned, is triggered by the signal through the transistor switch 242 on the negative going portion of the ID pulse. Gate 243A in turn momentarily closes the transistor switch 245, which switch, acts as a zero voltage clamp on the incoming "low" of the ID signal pulse from filter 227.

Figure 10:
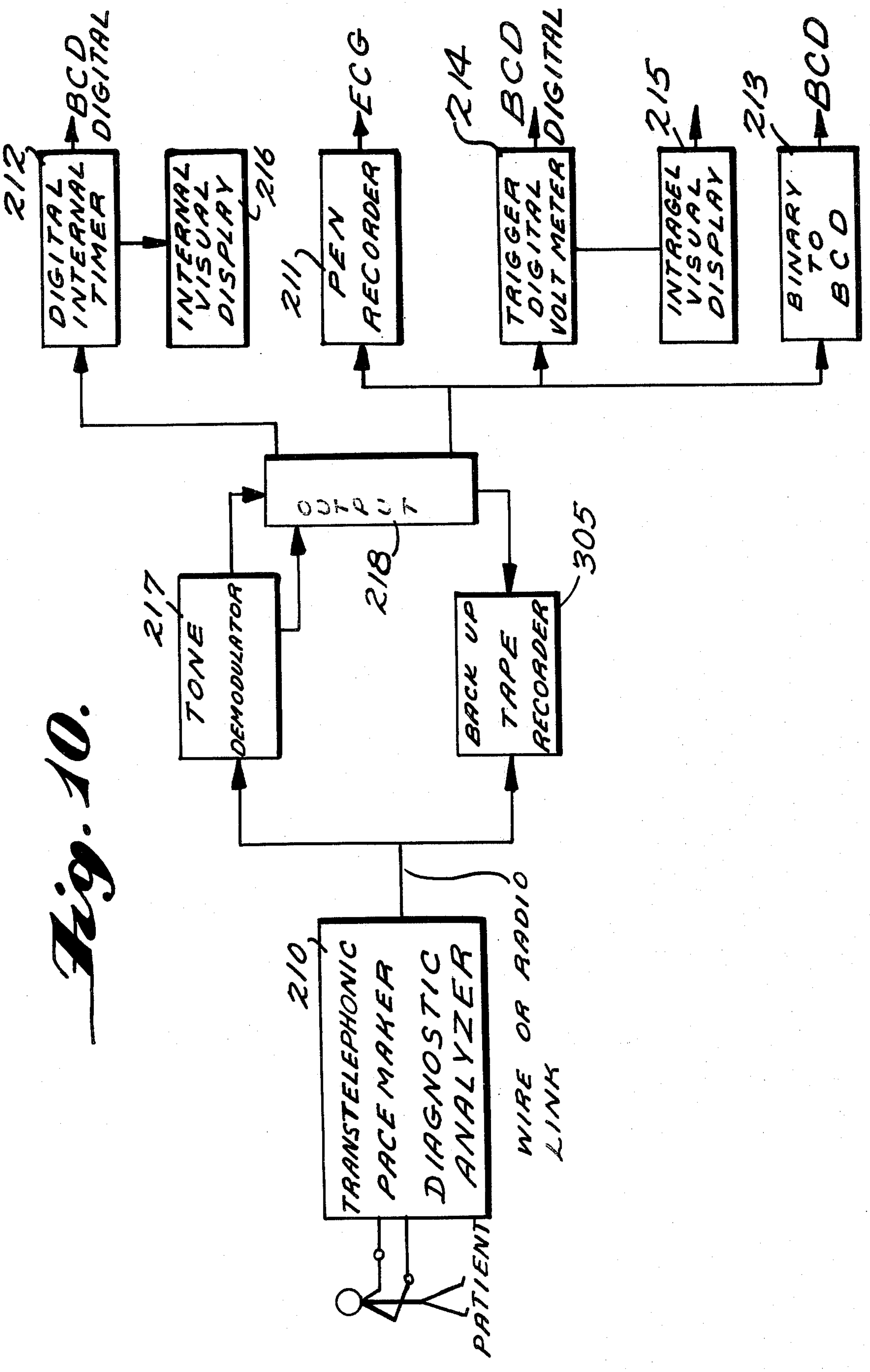
FIG. 10 is a functional block design of the central monitoring console of the present system.

The signal from filter 227 is fed to the final output amplifier 248 which has unity gain, the output of amplifier which drives chart recorder pen 211 (FIG. 10).

Also in the output circuit is a series of relays 247 which are activated by the dc voltage from the squelch 244 which was used to open gate 243B. The relays 247 supply switching to the power needed to start the chart recorder drive and pen heater. The relay switch 247' can also be used to turn on the other equipment, i.e., tape recorders, etc.

Figure 12:
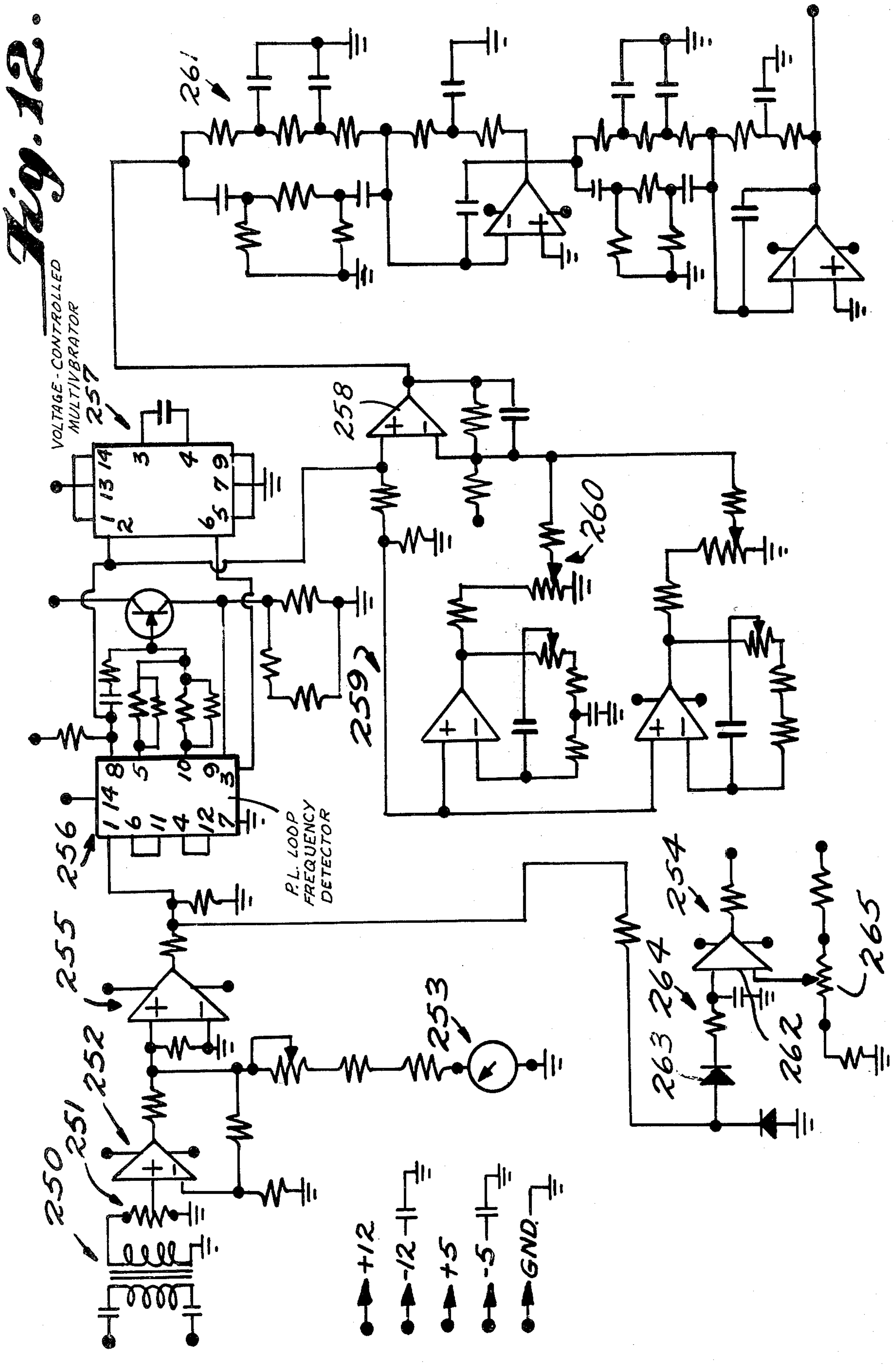
FIG. 12 is a circuit diagram of the first form of the demodulator 217 shown in FIG. 11A.

The circuit diagram of the first form of the demodulator 217 of FIG. 11A is shown in FIG. 12. The telephone input line is fed through isolation line transformer 250 through an input level control 251 and to an amplifier 252 with a gain of about 100. The output of amplifier 252 is divided into three branches. One goes to a level meter 253 (scaled in VU); the second branch goes to a comparator unit 254 which serves as the squelch. The third branch goes to another comparator unit 255 which takes the incoming sine-wave signal and converts it to a square wave. The output of comparator 255 is fed into a phase-locked loop frequency detector (PLL) unit 256. The PLL 256 is connected, in a standard configuration, to a voltage controlled multivibrator (VCM) 257. In effect, the detector 256 converts the input frequency to an error voltage which is then fed to the VCM 257 to control its frequency. The output of the VCM 257 is then used as the reference link back to the PFD 256 is a phase-locked loop. This enables the system to respond linearly over the range of frequencies used by the diagnostic transmitter.

The output of the PLL 256 is also fed to another amplifier 258 which is connected in differential configuration whose second input comes from the output of a 60 Hz notch amplifier 259. The 60 Hz notch amplifier 259 is fed into the inverting input of amplifier 258 and by proper setting of the level by control 260 at 60 Hz component of demodulated signal is balanced out. The output of amplifier 258 is fed into a two stage active filter 261 of the linear-phase-shift type. This filter has a 3 db roll-off at about 80 Hz which is well below the carrier frequencies thereby excluding carrier noise. The output of filter 261 is fed to an output circuit to be described later in the descriptions.

The squelch circuit 254 is comprised of a comparator 262 which receives the carrier signal through a half-wave rectifier 263 which in turn supplies a filter network 264 whose RC time constant is set approximately 1 sec. When this rectified dc voltage from the carrier signal exceeds that of the voltage set by the level control 265 on the other input of the comparator, the full positive supply voltage appears at the output of comparator 262. This output also feeds an output circuit board by the interwiring of connectors.

Figure 13:
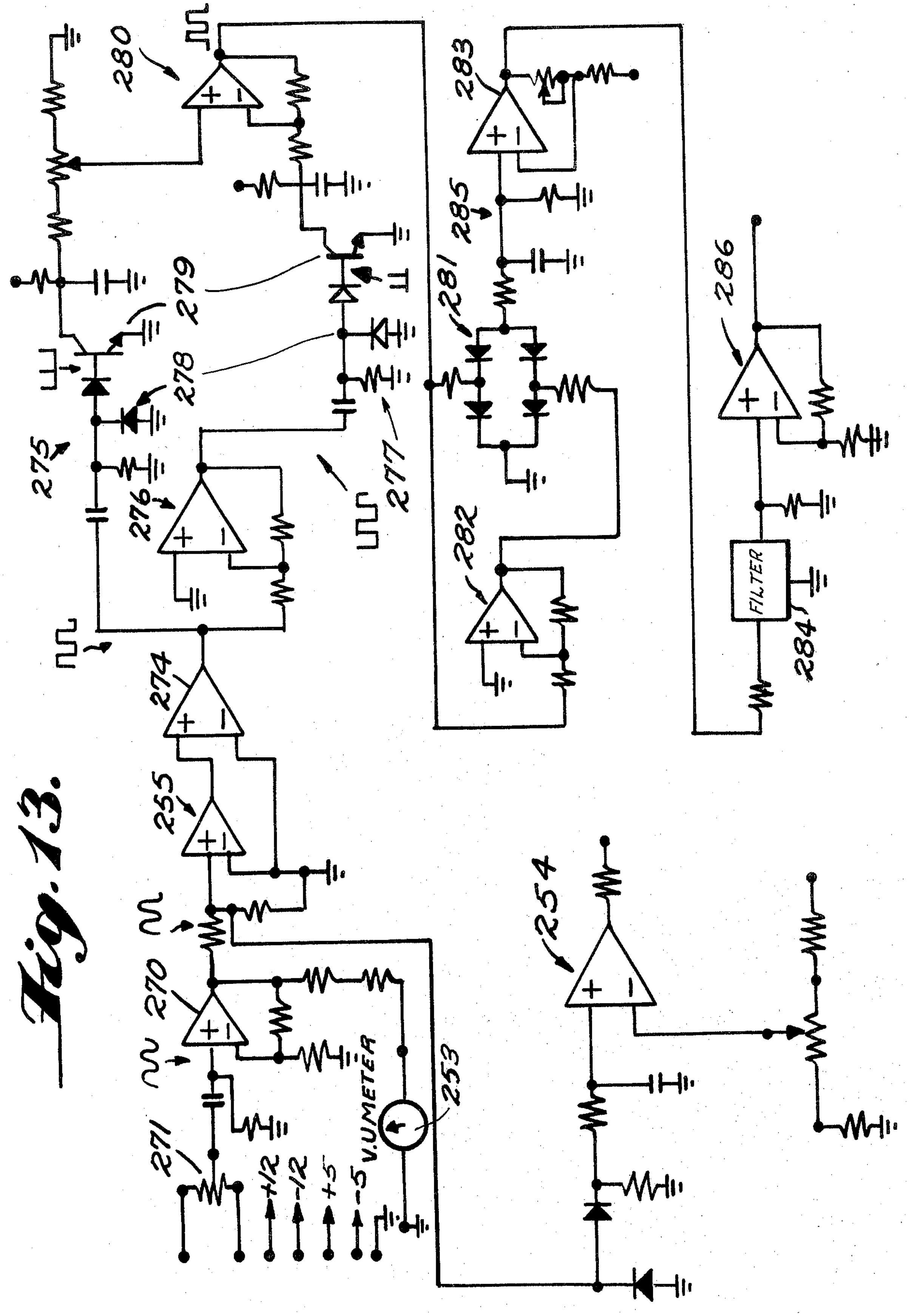
FIG. 13 is a circuit diagram of the second form of the demodulator 217 shown in FIG. 11B.

The circuit diagram of the second form of demodulator 217 is shown in FIG. 13. The telephone line signal is fed directly to amplifier 270 through an input level control 271. The amplifier 271 has a gain of about 100. The output from 270 is divided into three branches, the same as that of the demodulator shown in FIG. 12. One branch is to the level meter 253, one branch to the squelch circuit 254 and one to amplifier 255. To eliminate the uncertainty of the leading edge of the output of square-wave from amplifier 255 is fed to another amplifier 274 following amplifier 255 to ensure short turn-on and turn-off of the square-waves going into the frequency to voltage converter.

Following amplifier 274 the signal divides into two branches. One branch going directly to sawtooth generating circuit 275 the other branch goes through an inverter 276 and then on to a sawtooth generator 277. Both sawtooth generators 275 and 277 operate on the charging curve of R and C. The input square waves from amplifier 274 goes to the differentiator diode-pass combinations 278 which switch the transistors 279 on for every square - wave leading edge thereby discharging C to ground. Capacitors C are thereafter allowed to charge when transistors 279 shut off. These two branches of sawtooth signal are then combined in the differential amplifier 280.

Since the keying signals applied to sawtooth generators 275 and 277, through the shaping circuits 278, are 180° out of phase, the sawtooth signal at the inputs of differential amplifier 280 are now alternating 180° apart. Since they drive the amplifier 280 as a differential amplifier, the resulting output of amplifier 280 is, then, a square-wave whose amplitude is proportional to the amount of time capacitors C are allowed to change. This, of course, is directly related to the frequency of the input signal. Hence, the circuit is a frequency to voltage converter.

The output of amplifier 280 is also divided into two branches. One branch goes directly to a full-wave bridge rectifier 281 the other branch is sent through an inverter 282 and then to the other half of the bridge rectifier 281. Here the square-wave is converted to a dc level proportional to frequency. The advantage of this type of demodulator is that it has an information band-with which approaches the theoretical limit for a given carrier frequency without requiring a filter such as 227 in FIG. 10. This is a result of the fact that the output of the voltage to frequency converter is a square-wave which may be rectified to dc with little or no carrier ripple.

Following the rectifier 281 is a variable gain amplifier 283 which is used to match the input impedance of a 60 Hz passive notch T-filter 284. An RC filter 285 removes any residual carrier noise. Likewise, a final amplifier 286 is used to match the output impedence of filter 284.

Figure 14:
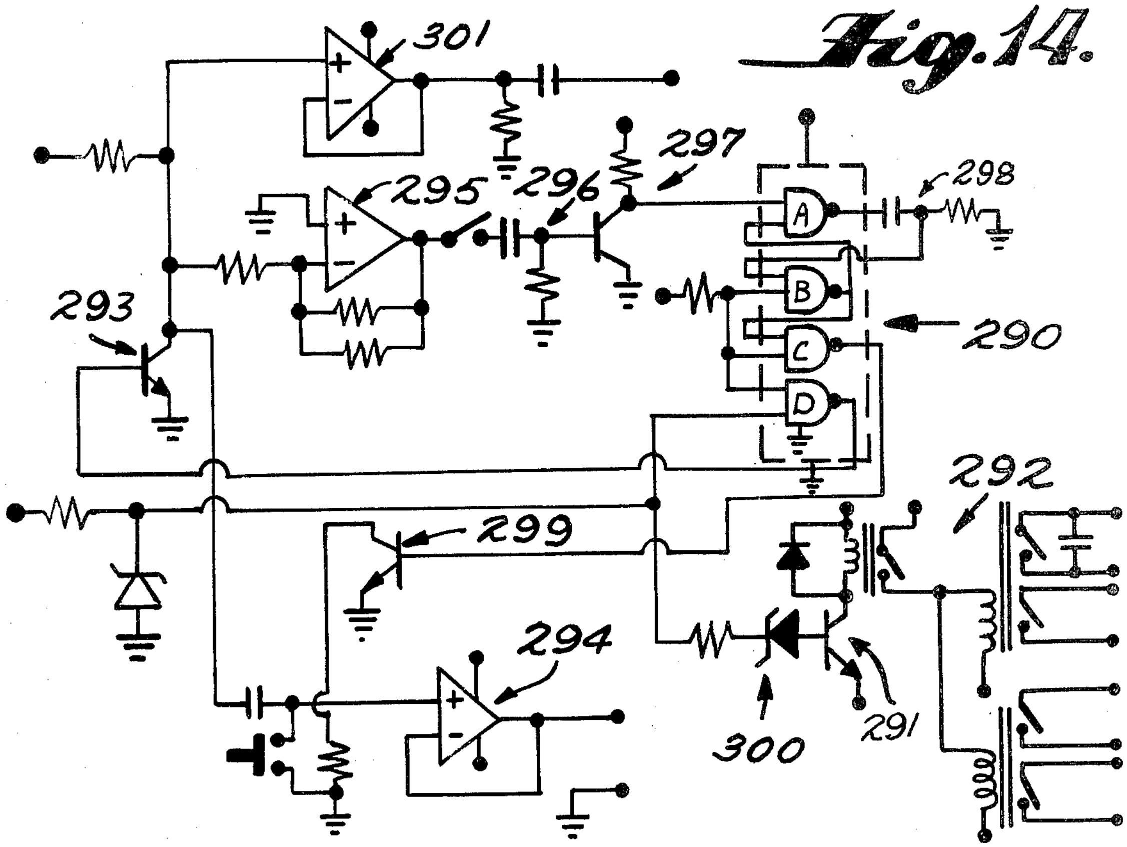
FIG. 14 illustrates the output circuit 218 of FIG. 10.

The circuit diagram of the output circuits 218 herein is shown in FIG. 14. The basic portion of the output circuit is the logic module which is a quad-NAND-Gate 290 including gates A-D. Gate (D) is used in conjunction with the squelch circuit 254 in FIG. 12 and serves as a gate to open the signal channels. The gate (D) receives, from the squelch circuit, a dc signal one second after the start of the carrier tone. At the same time, this squelch dc voltage is also applied to a transistor switch 291 which activates the relay circuits 292.

The squelch signal drives the NAND gate Section D to "zero", the low state, which in turn, opens the transistor switch 293. With 293 open, the signal channel is activated with the signal branching into three circuits. One branch runs through a unity gain amplifier 294 which supplies an output for a pen recorder. The third branch runs through an inverter 295 which has a gain of about 5.

The output of inverter 295 is differentiated by the RC combination 296. It should be pointed out that the differentiator 296 serves as a rise time detector. Consequently the triggering of amplifier 297 only occurs with the fast rise time pulses (2 ms) such as the ID and data pulses. Slow rise time pulses, such as the ECG (limited to 10 ms in the transmitting unit) do not cause triggering of amplifier 297 and pass unaffected.

The timing of a one shot multivibrator formed by gates A and B of Gate 290 is such that at the end of the ID pulse, immediately following the trailing edge of these pulses, the input signal is clamped to zero for a baseline reference point. This clamping occurs only following trailing edges during the ID pulses and data pulses.

The positive going differentiated pulse turns the transistor switch 297 off thereby dropping the voltage on the collector of switch 297 to zero during that time. This allows NAND gate section (A) to be driven high. The output of section (B) to a low state. The differentiator 298 RC time constant is set to hold gate section (B) low for about 15 msec. at which time it then goes high. The output of section (B) in turn drives the NAND gate section (C) to a high state. The output of section (C) turns transistor switch 299 off thereby zero clamping the input signal to amplifier 294. The zero clamp then operates only after the trailing edge of each ID pulse or data pulse and stays on for 14 msec. Any other slowly varying signal, eg the ECG will not affect the zero damp operation.

The same squelch signal which is applied to the NAND gate section (D) is also applied to transistor switch 291. The base of transistor 291 is protected by the zener diode 300. This prevents the possibility of damaging forward current passing through the transistor 291. Once the transistor switch 291 is closed relay action occurs allowing the chart recorder pen motor and pen heater and also the tape recorder motors and pen heater and also the tape recorder motors to be activated.

The signal is also coupled to amplifier 301 which drives counter 212 of FIG. 10 as previously noted.

While there have been described what at present are considered to be the preferred embodiments of the present invention it will be obvious to those skilled in the art that various changes and modifications may be made therein without departing from the invention and it is believed in the appended claims to cover all such changes and modification as fall within the true specification and scope of the invention.

What is claimed is:

1. A system for providing transtelephonic information for a plurality of patients remotely located from a central data processing clinic, the information to be transmitted being related to coronary functions and including artificial cardiac pacer pulse information, comprising:

means responsive to cardiac pacer pulses including bandwidth compression means for producing outputs representative of selected characteristics of said cardiac pacer pulses, said outputs having a bandwidth substantially less than the cardiac pacer pulses;

a transmission means;

control means for sequentially producing gating signals for sequentially gating each of said respective outputs to said transmission means, said transmission means responsive to said outputs for producing output audio signals indicative respectively of each of said outputs.

2. The apparatus as described in claim 1 wherein said means responsive to cardiac pacer pulses includes means adapted to be coupled to the patient for detecting cardiac pacer pulses and further comprises means for discriminating between cardiac pacer pulses and noise including: a circuit means for detecting input signal rise time less than a selected maximum and;

a circuit means for detecting pulse duration greater than a selected minimum;

sample and hold means responsive to said circuit means for storing said signals over their respective intervals, if said respective maximum and minimums occur and reset means for cancelling storage if either of said maximum and minimums are absent.

3. The apparatus as described in claim 2 wherein said sample and hold means include peak amplitude storage means responsive to the amplitude of the sampled signal, said storage means charged to a maximum in accordance with the maximum amplitude of said input, and area storage means responsive to the total response of said input for developing an area signal indicative of the area excursion of said input pulse, and means for developing from said area signal a signal indicative of the width of said input pulse.

4. The apparatus of claim 3 further including clock means providing a particular frequency clock signal as a timing basis, width detector means responsive to the duration of said input as determined through use of said timing basis for producing an output indicative thereof and means for expanding said width indicator by a selected factor for increasing the time scale thereof.

5. The apparatus of claim 4 wherein the means for expanding the signal width is a frequency divider circuit for generating a different frequency clock signal as a timing basis.

6. The apparatus of claim 2 wherein said discriminating means comprises a differentiator and integrator for respectively detecting the maximum rise time and the minimum duration.

7. The apparatus of claim 1 further including identification memory means for generating an identification output uniquely indicative of one of said plurality of patients and including means coupling said identification output to said transmission means.

8. The apparatus as described in claim 7 wherein said identification memory means includes a storage register which stores sequential bits indicative of the identification of said one patient.

9. The apparatus as described in claim 8 wherein said storage register is a shift register having selected stages set for uniquely identifying the patient.

10. The apparatus of claim 7 wherein said control means includes logic means for producing gating signals for sequential delivery of the respective outputs and identification data.

11. The apparatus as described in claim 7 further including an electrocardiograph for delivering another related coronary function namely electrocardiographic (ECG) responses.

12. The apparatus of claim 11 wherein the system includes a clock for sequentially driving said identification means, and sequencer means responsive to said clock for sequentially gating the respective outputs, the identification data and the ECG responses.

13. The apparatus of claim 12 wherein said sequencer means includes commutator means for providing a path each for the outputs, identification data and ECG responses and a gate for sequencing said commutator according to a selected cycle for opening one commutator output at a time for the transmission means.

14. The apparatus according to claim 1 wherein said means responsive to cardiac pacer pulses include:

means responsive to each of the plurality of cardiac pacer parameters for storing same at a selected rate commensurable with real time and read out means for each stored parameter for producing the output at a second rate substantially slower than the input rate such that the output signals produced represent the actual cardiac pacer parameters but on a longer time scale thereby permitting telephonic transmission thereof.

15. The apparatus of claim 14 wherein said storage means includes: a shift register responsive to said parameters; a clock, said clock driving the register at the selected rate for storing each of the parameters in real time and means for dividing the clock output, for clocking out the information at the second rate substantially slower than the first rate such that the output wave forms are compatible with band pass characteristics of the transmission system, thereby permitting transmission of the actual wave form substantially undistorted to the central location.

16. The apparatus as described in claim 1 wherein said means responsive to cardiac pacer pulses comprises:

analysis means for converting said pulses into analog parameters of said cardiac pacer pulse characteristics for transmission to said central location.

17. The apparatus of claim 1 wherein said means responsive to cardiac pulses comprises a storage means for expanding the cardiac pacer pulses into signals proportional in wave form characteristics to the cardiac pacer pulses, but with a frequency spectrum compressed so as to be compatible with transmission means.

18. The apparatus according to claim 1 further including:

means at the central location responsive to said transmitted signals from the remote location, for processing same in accordance with stored criteria to generate cardiac pacer performance information unique to the patient and means for displaying said cardiac pacer performance information.

19. The apparatus of claim 18 wherein said means at the central location includes demodulator means responsive to the incoming signals from the remote location for producing output signals indicative of the information transmitted from the remote location.

20. The apparatus of claim 19 wherein said demodulator comprises:

a phase-locked loop detector for producing a variable output in response to the input signals and a voltage controlled multivibrator for producing a reference output for controlling phase continuity of the detector thereby providing an output indicative of the remotely transmitted information.

21. The apparatus of claim 19 wherein said means for displaying said cardiac pacer performance information includes an output circuit means and a plurality of record keeping devices including a pen, tape and computer memory recorders, said output circuit means generating a plurality of outputs for said plurality of record keeping devices.

22. A method of diagnosing the condition of relevant coronary parameters of a patient remotely located from a central diagnostic clinic, including:

coupling a detector means to a patient for detecting waveforms of said parameters;

analyzing said waveforms for preserving certain selected characteristics of said waveforms indicative of the coronary condition of the patient including the step of compressing the bandwidth of the selected characteristics of said waveforms;

transmitting said bandwidth compressed selected characteristics along with identification data over a telephonic system to the central location;

and displaying said selected characteristics at the central location, each of said previous steps occurring in a selected sequence for serial transmission to the central clinic.

23. The method of claim 22 wherein detecting wave forms of said parameters includes:

operatively attaching the patient to sending apparatus and activating same for sequentially reading parameters of Electrocardiogram.

24. The method of claim 23 wherein the patient is an electronic cardiac pacer user and the diagnosis is for detecting the status of available energy of said cardiac pacer and said readings further include:

sequentially reading additional parameters of the cardiac pacer including the cardiac pacer pulse wave form; and deriving from said cardiac pacer pulse wave form signals proportional to selected characteristics thereof and transmitting said signals proportional to the selected characteristics to the central location.

25. The method of claim 24 wherein analyzing for transmission includes detecting the characteristics of the waveform including height, width, area under parameter pulses and frequence.

26. The method of claim 24 wherein the step of deriving signals proportional to selected characteristics of the cardiac pacer pulse wave forms includes time expansion of the characteristics of the wave form including the steps of recording said characteristics in a storage device at a selected recording rate and reading out said stored information at selected different rates compatible with transmission apparatus to be utilized.

27. The method of claim 26 wherein said different read out rate is substantially slower than the recording rate for transtelephonic transmission.

28. The method of claim 22 wherein:

analysis includes the step of time expanding the information at the remote location for rendering the information into signals compatible with the bandwidth of a transmission system, and including the step of recording the signals at the central location.

* * * * *